(12) United States Patent
Igarashi

(10) Patent No.: US 11,959,999 B2
(45) Date of Patent: Apr. 16, 2024

(54) INFORMATION PROCESSING DEVICE, INFORMATION PROCESSING METHOD, COMPUTER PROGRAM, AND MOBILE DEVICE

(71) Applicant: Sony Semiconductor Solutions Corporation, Kanagawa (JP)

(72) Inventor: Shinji Igarashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 393 days.

(21) Appl. No.: 17/255,253

(22) PCT Filed: Jul. 1, 2019

(86) PCT No.: PCT/JP2019/026097
§ 371 (c)(1),
(2) Date: Dec. 22, 2020

(87) PCT Pub. No.: WO2020/009060
PCT Pub. Date: Jan. 9, 2020

(65) Prior Publication Data
US 2021/0224617 A1    Jul. 22, 2021

(30) Foreign Application Priority Data

Jul. 2, 2018 (JP) ................. 2018-126397

(51) Int. Cl.
*G01S 13/06* (2006.01)
*G01S 7/41* (2006.01)
(Continued)

(52) U.S. Cl.
CPC ............ *G01S 13/865* (2013.01); *G01S 7/412* (2013.01); *G01S 13/867* (2013.01);
(Continued)

(58) Field of Classification Search
CPC ...... G01S 13/865; G01S 7/412; G01S 13/867; G01S 13/931; G06V 20/58; G06F 18/251; G05D 1/0212
See application file for complete search history.

(56) References Cited

U.S. PATENT DOCUMENTS 10,762,440 B1 * 9/2020 Garg ..................... G01S 13/867
2012/0083974 A1 * 4/2012 Sandblom .............. A61B 5/163
702/19

(Continued)

FOREIGN PATENT DOCUMENTS

CN    107991671 A    5/2018
CN    108028023 A    5/2018
(Continued)

OTHER PUBLICATIONS

International Search Report and English translation dated Sep. 24, 2019 in connection with International Application No. PCT/JP2019/026097.
(Continued)

*Primary Examiner* — Peter M Bythrow
(74) *Attorney, Agent, or Firm* — Wolf, Greenfield & Sacks, P.C.

(57) ABSTRACT

There is provided an information processing device that processes detection information of an external recognition sensor.
The information processing device includes: a recognition unit that performs recognition processing on an object on the basis of a detection signal of the sensor; and a processing unit that performs fusion processing on first data before the recognition by the recognition unit and another data. The information processing device further includes a second recognition unit that performs recognition processing on the object on the basis of a detection signal of a second sensor. The processing unit performs fusion processing on third data (Continued)

before the recognition by the second recognition unit and the first data, fusion processing on fourth data after the recognition by the second recognition unit and the first data, and the like.

20 Claims, 18 Drawing Sheets

(51) Int. Cl.
    *G01S 13/86*     (2006.01)
    *G01S 13/931*     (2020.01)
    *G05D 1/02*     (2020.01)
    *G06F 18/25*     (2023.01)
    *G06V 20/58*     (2022.01)
    *G05D 1/00*     (2006.01)

(52) U.S. Cl.
    CPC .......... *G01S 13/931* (2013.01); *G06F 18/251* (2023.01); *G06V 20/58* (2022.01); *G05D 1/0212* (2013.01)

(56) References Cited

U.S. PATENT DOCUMENTS

| | | | | |
|---|---|---|---|---|
| 2012/0163671 A1* | 6/2012 | Choi | ...................... | G06V 20/58 382/104 |
| 2015/0112570 A1* | 4/2015 | Schmudderich | ....... | G06V 20/58 701/1 |
| 2016/0082597 A1* | 3/2016 | Gorshechnikov | .... | G06V 10/462 901/1 |
| 2016/0314097 A1* | 10/2016 | Bradford | .................. | G01D 1/16 |
| 2016/0357187 A1* | 12/2016 | Ansari | .................. | G06T 19/003 |
| 2017/0242117 A1* | 8/2017 | Izzat | ........................ | G01S 17/66 |
| 2017/0358102 A1* | 12/2017 | Akiyama | .................. | G06T 7/20 |
| 2018/0336191 A1* | 11/2018 | Rao | ...................... | G06F 3/04883 |
| 2018/0348360 A1* | 12/2018 | Wang | ...................... | G01S 7/354 |
| 2019/0137619 A1* | 5/2019 | Fetterman | ............. | G01S 13/931 |
| 2019/0353774 A1* | 11/2019 | Chondro | .................. | G01S 17/86 |
| 2021/0133486 A1* | 5/2021 | Yu | ........................... | G01S 17/86 |

FOREIGN PATENT DOCUMENTS

| | | |
|---|---|---|
| EP | 1837804 A1 | 9/2007 |
| EP | 3208635 A1 | 8/2017 |
| JP | 2003-162795 A | 6/2003 |
| JP | 2007-255977 A | 10/2007 |
| JP | 2017-132285 A | 8/2017 |
| JP | 2020543740 | 11/2018 |
| JP | 2021501344 A | 1/2021 |
| WO | WO 2019/090276 A1 | 5/2019 |

OTHER PUBLICATIONS

International Written Opinion and English translation dated Sep. 24, 2019 in connection with International Application No. PCT/JP2019/026097.
International Preliminary Report on Patentability and English translation dated Jan. 14, 2021 in connection with International Application No. PCT/JP2019/026097.
Extended European Search Report dated Aug. 6, 2021 in connection with European Application No. 19831260.5.

* cited by examiner

FIG. 13

| PATTERN | CAMERA | MILLIMETER WAVE RADAR | Late PROCESSING RESULT |
|---|---|---|---|
| 1 | ○ | ○ | ○ |
| 2 | ○ | × | × |
| 3 | × | ○ | × |
| 4 | × | × | × |

FIG. 14

| PATTERN | CAMERA | MILLIMETER WAVE RADAR | Early PROCESSING RESULT |
|---|---|---|---|
| 1 | ○ | ○ | ○ |
| 2 | ○ | ○ | ○ |
| 3 | × | ○ | × |
| 4 | × | ○ | △ |

FIG. 15

| PATTERN | CAMERA | MILLIMETER WAVE RADAR | Late PROCESSING RESULT |
|---|---|---|---|
| 2 | ○ | × | × |

| PATTERN | CAMERA | MILLIMETER WAVE RADAR | Early PROCESSING RESULT |
|---|---|---|---|
| 2 | ○ | ○ | ○ |

FIG. 16

| PATTERN | CAMERA | MILLIMETER WAVE RADAR | Late PROCESSING RESULT |
|---|---|---|---|
| 4 | × | × | × |

| PATTERN | CAMERA | MILLIMETER WAVE RADAR | Early PROCESSING RESULT |
|---|---|---|---|
| 4 | × | ○ | △ |

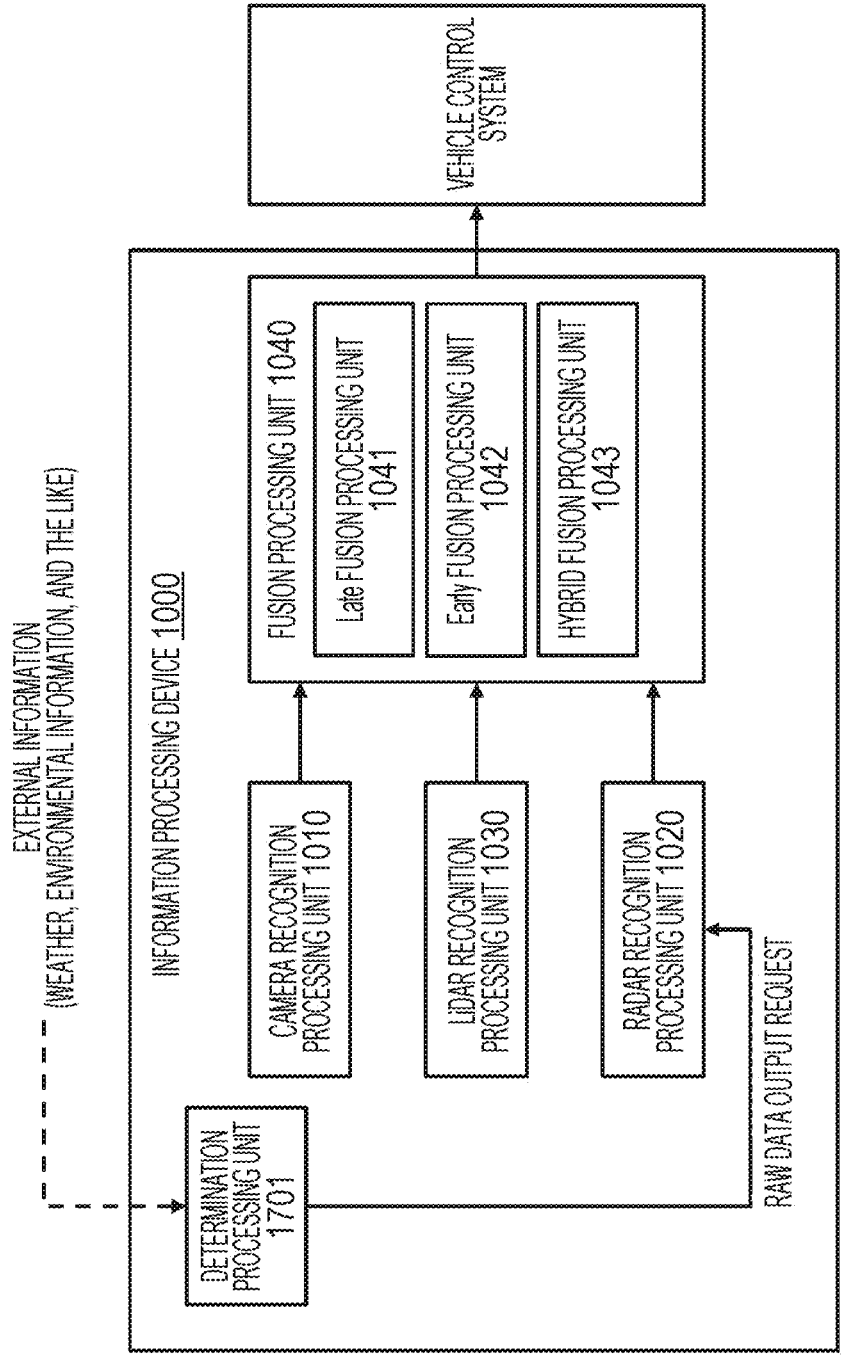

INFORMATION PROCESSING DEVICE, INFORMATION PROCESSING METHOD, COMPUTER PROGRAM, AND MOBILE DEVICE

CROSS-REFERENCE TO RELATED APPLICATIONS

The present application is a U.S. National Stage Entry of International Application No. PCT/JP2019/026097, filed Jul. 1, 2019, which claims priority to Japanese Patent Application Number JP2018-126397, filed on Jul. 2, 2018.

TECHNICAL FIELD

The technology disclosed in the present specification relates to an information processing device, an information processing method, a computer program, and a mobile device that process information detected by a plurality of sensors for mainly recognizing the external world.

BACKGROUND ART

To implement automated driving and advanced driver assistance system (ADAS), it is necessary to detect various objects such as other vehicles, persons, and lanes. Furthermore, it is necessary to detect objects not only in the daytime in fine weather but also in various environments such as rainy weather and at night. For this reason, many external recognition sensors of different types, such as cameras, millimeter wave radars, and laser radars, are beginning to be installed in vehicles.

Each sensor has its strong and weak points. The recognition performance of a sensor may deteriorate depending on the type and size of the object to be detected, the distance to the object, the weather at the time of detection, or the like. For example, a vehicle-mounted radar has high distance accuracy and relative speed accuracy, but low angle accuracy, and does not have an identification function of identifying the type of object, or identification accuracy is low. Meanwhile, a camera has relatively low distance accuracy and relative speed accuracy, but has good angle accuracy and identification accuracy.

Therefore, not only using each sensor alone, but also combining two or more sensors to take advantage of characteristics of each sensor contributes to more accurate external recognition. The combination of two or more sensors will be hereinafter referred to as "sensor fusion" or "fusion".

For example, a road traffic monitoring system has been proposed in which a combination of a plurality of sensors with different detection characteristics is switched and used on the basis of environmental indicators such as temperature data, rainfall data, visibility data, and illuminance data (see Patent Document 1).

Furthermore, a vehicle traveling control system has been proposed that prepares a plurality of fusion specifications for the external environment and notifies a driver of a detection area of a sensor where recognition accuracy decreases due to the external environment and calls attention in the selected fusion specification (see Patent Document 2).

CITATION LIST

Patent Document

Patent Document 1: Japanese Patent Application Laid-Open No. 2003-162795

Patent Document 2: Japanese Patent Application Laid-Open No. 2017-132285

SUMMARY OF THE INVENTION

Problems to be Solved by the Invention

An object of the technology disclosed in the present specification is to provide an information processing device, an information processing method, a computer program, and a mobile device that perform fusion processing on a plurality of sensors for mainly recognizing the external world.

Solutions to Problems

A first aspect of technology disclosed in the present specification is an information processing device including:
  a recognition unit configured to perform recognition processing on an object on the basis of a detection signal of a sensor; and
  a processing unit configured to perform fusion processing on first data before the recognition by the recognition unit and another data.

The sensor includes, for example, a millimeter wave radar. Then, before the recognition, the recognition unit performs processing of each of distance detection, speed detection, angle detection of the object, and tracking of the object on the basis of the detection signal of the sensor, and the first data includes at least one of the detection signal, a distance detection result of the object, a speed detection result, an angle detection result, or a tracking result of the object. Then, the processing unit may perform at least one fusion processing of fusion processing on third data before the recognition by the second recognition unit and the first data, fusion processing on fourth data after the recognition by the second recognition unit and the first data, fusion processing on the first data and second data after the recognition by the recognition unit, or fusion processing on the fourth data and the second data.

Furthermore, the information processing device according to the first aspect further includes a second recognition unit that performs recognition processing on an object on the basis of a detection signal of a second sensor including at least one of a camera or a LiDAR. Then, in a case where the recognition result by the second recognition unit is good but the recognition result by the recognition unit is not good, the processing unit performs fusion processing on the first data. Alternatively, in a case where the recognition result by the second recognition unit is not good, the processing unit performs fusion processing on the first data.

Furthermore, a second aspect of the technology disclosed in the present specification is an information processing method including:
  a recognition step of performing recognition processing on an object on the basis of a detection signal of a sensor; and
  a processing step of performing fusion processing on first data before the recognition in the recognition step and another data. The processing step may include performing at least one fusion processing of fusion processing on third data before the recognition by the second recognition unit and the first data, fusion processing on fourth data after the recognition by the second recognition unit and the first data, fusion processing on the first data and second data after the recognition by the recognition unit, or fusion processing on the fourth data and the second data.

Furthermore, a third aspect of the technology disclosed in the present specification is a computer program described in a computer-readable format for causing a computer to function as:

a recognition unit configured to perform recognition processing on an object on the basis of a detection signal of a sensor; and a processing unit configured to perform fusion processing on first data before the recognition by the recognition unit and another data. The processing unit may perform at least one fusion processing of fusion processing on third data before the recognition by the second recognition unit and the first data, fusion processing on fourth data after the recognition by the second recognition unit and the first data, fusion processing on the first data and second data after the recognition by the recognition unit, or fusion processing on the fourth data and the second data.

The computer program according to the third aspect defines a computer program described in a computer-readable format so as to implement predetermined processing on a computer. In other words, by installing the computer program according to the third aspect in the computer, a collaborative action is exhibited on the computer, and similar actions and effects to the information processing device according to the first aspect can be obtained.

Furthermore, a fourth aspect of the technology disclosed in the present specification is a mobile device including:

a moving means;

a sensor;

a recognition unit configured to perform recognition processing on an object on the basis of a detection signal of the sensor;

a processing unit configured to perform fusion processing on first data before the recognition by the recognition unit and another data; and a control unit configured to control the moving means on the basis of a processing result of the processing unit. The processing unit may perform at least one fusion processing of fusion processing on third data before the recognition by the second recognition unit and the first data, fusion processing on fourth data after the recognition by the second recognition unit and the first data, fusion processing on the first data and second data after the recognition by the recognition unit, or fusion processing on the fourth data and the second data.

Effects of the Invention

The technology disclosed in the present specification can provide an information processing device, an information processing method, a computer program, and a mobile device that perform fusion processing on a plurality of sensors for mainly recognizing the external world.

Note that effects described in the present specification are merely illustrative, and effects of the present invention is not limited to these effects. Furthermore, the present invention may produce additional effects in addition to the effects described above.

Still another object, feature, and advantage of the technology disclosed in the present specification will be apparent from more detailed descriptions based on the embodiment as described later and the accompanying drawings.

BRIEF DESCRIPTION OF DRAWINGS

FIG. 13 is a diagram showing an example of a fusion processing result (late fusion processing only) by the information processing device 1000.

FIG. 14 is a diagram showing an example of the fusion processing result (including early fusion processing) by the information processing device 1000.

FIG. 15 is a diagram showing an example in which results differ between late fusion processing and early fusion processing.

FIG. 16 is a diagram showing an example in which results differ between late fusion processing and early fusion processing.

FIG. 17 is a diagram showing a configuration example of the information processing device 1000 configured to perform early fusion processing adaptively.

MODE FOR CARRYING OUT THE INVENTION

Hereinafter, an embodiment of the technology disclosed in the present specification will be described in detail with reference to the drawings.

Figure 1:
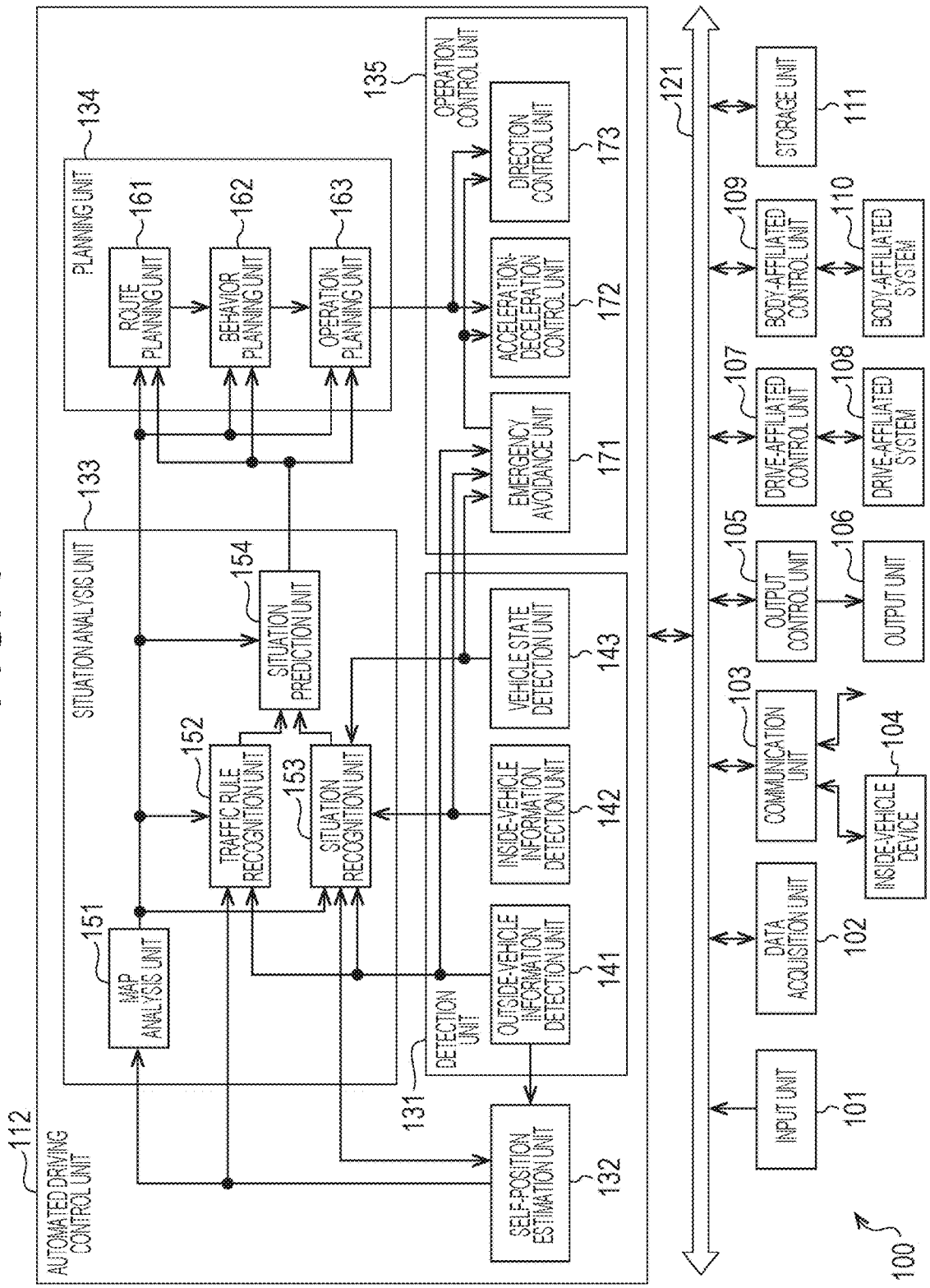
FIG. 1 is a block diagram showing a schematic functional configuration example of a vehicle control system 100.

FIG. 1 is a block diagram showing a schematic functional configuration example of a vehicle control system 100, which is one example of a mobile body control system to which the present technology can be applied.

Note that hereinafter, in a case where a vehicle provided with the vehicle control system 100 is distinguished from other vehicles, the vehicle is referred to as own vehicle or self vehicle.

The vehicle control system 100 includes an input unit 101, a data acquisition unit 102, a communication unit 103, an inside-vehicle device 104, an output control unit 105, an output unit 106, a drive-affiliated control unit 107, a drive-affiliated system 108, a body-affiliated control unit 109, a body-affiliated system 110, a storage unit 111, and an automated driving control unit 112. The input unit 101, the data acquisition unit 102, the communication unit 103, the output control unit 105, the drive-affiliated control unit 107, the body-affiliated control unit 109, the storage unit 111, and the automated driving control unit 112 are connected to each other via a communication network 121. The communication network 121 includes, for example, a vehicle-mounted communication network, a bus, and the like conforming to arbitrary standards such as controller area network (CAN), local interconnect network (LIN), local area network (LAN), or FlexRay (registered trademark). Note that each unit of the vehicle control system 100 may be directly connected without going through the communication network 121.

Note that hereinafter, in a case where each unit of the vehicle control system 100 performs communication via the communication network 121, the description of the communication network 121 will be omitted. For example, in a case where the input unit 101 and the automated driving control unit 112 communicate with each other via the communication network 121, it is simply described that the input unit 101 and the automated driving control unit 112 communicate with each other.

The input unit 101 includes a device to be used by an occupant to input various data, instructions, and the like. For example, the input unit 101 includes an operation device such as a touch panel, a button, a microphone, a switch, and a lever, and an operation device and the like that allows input by a method other than manual operation such as voice and gesture. Furthermore, for example, the input unit 101 may be a remote control device using infrared rays or other radio waves, or may be an externally connected device including a mobile device, a wearable device, or the like that supports the operation of the vehicle control system 100. The input unit 101 generates an input signal on the basis of data, instructions, and the like input by an occupant, and supplies the input signal to each unit of the vehicle control system 100.

The data acquisition unit 102 includes various sensors and the like that acquire data to be used for processing by the vehicle control system 100, and supplies the acquired data to each unit of the vehicle control system 100.

For example, the data acquisition unit 102 includes various sensors for detecting the state of the own vehicle and the like. Specifically, for example, the data acquisition unit 102 includes a gyro sensor, an acceleration sensor, an inertial measurement unit (IMU), and sensors and the like for detecting an accelerator pedal operation amount, a brake pedal operation amount, a steering wheel steering angle, the number of engine rotations, the number of motor rotations, a wheel rotation speed, or the like.

Furthermore, for example, the data acquisition unit 102 includes various sensors for detecting information outside the own vehicle. Specifically, for example, the data acquisition unit 102 includes an image capturing device such as a time of flight (ToF) camera, a stereo camera, a monocular camera, an infrared camera, and other cameras. Furthermore, for example, the data acquisition unit 102 includes an environmental sensor for detecting the weather, atmospheric phenomena, or the like, and a surrounding information detection sensor for detecting an object around the own vehicle. The environmental sensor includes, for example, a raindrop sensor, a fog sensor, a sunshine sensor, a snow sensor, and the like. The surrounding information detection sensor includes, for example, an ultrasonic wave sensor, a millimeter wave radar, a light detection and ranging, laser imaging detection and ranging (LiDAR), a sonar, and the like.

Moreover, for example, the data acquisition unit 102 includes various sensors for detecting the current position of the own vehicle. Specifically, for example, the data acquisition unit 102 includes a global navigation satellite system (GNSS) receiver and the like that receive a GNSS signal from a GNSS satellite.

Furthermore, for example, the data acquisition unit 102 includes various sensors for detecting inside-vehicle information. Specifically, for example, the data acquisition unit 102 includes an image capturing device that captures an image of a driver, a biometric sensor that detects biometric information on the driver, a microphone that collects voice inside the vehicle, and the like. The biometric sensor is provided, for example, on a seat surface, a steering wheel, or the like, and detects biometric information on an occupant seated on a seat or a driver holding the steering wheel.

The communication unit 103 communicates with the inside-vehicle device 104 and various devices, servers, base stations, and the like outside the vehicle. The communication unit 103 transmits data supplied from each unit of the vehicle control system 100, and supplies the received data to each unit of the vehicle control system 100. Note that the communication protocol supported by the communication unit 103 is not particularly limited, and furthermore, the communication unit 103 can support a plurality of types of communication protocols.

For example, the communication unit 103 performs wireless communication with the inside-vehicle device 104 by wireless LAN, Bluetooth (registered trademark), near field communication (NFC), wireless USB (WUSB), or the like. Furthermore, for example, the communication unit 103 performs wired communication with the inside-vehicle device 104 via a connection terminal (not shown) (and a cable if necessary) by universal serial bus (USB), high-definition multimedia interface (HDMI), mobile high-definition link (MHL), or the like.

Moreover, for example, the communication unit 103 performs communication with a device (for example, application server or control server) existing on an external network (for example, the Internet, a cloud network, or a network peculiar to a business operator) via a base station or access point. Furthermore, for example, the communication unit 103 performs communication with a terminal existing near the own vehicle (for example, pedestrian terminal or store terminal, or machine type communication (MTC) terminal) by using peer to peer (P2P) technology. Moreover, for example, the communication unit 103 performs V2X communication including vehicle-to-vehicle communication, vehicle-to-infrastructure communication, vehicle-to-home communication, vehicle-to-pedestrian communication, and the like. Furthermore, for example, the communication unit 103 includes a beacon receiving unit, receives radio waves or electromagnetic waves transmitted from a wireless station and the like installed on a road, and acquires information including the current position, traffic congestion, traffic regulations, required time, or the like.

The inside-vehicle device 104 includes, for example, a mobile device or a wearable device owned by an occupant, an information device carried in or attached to the own vehicle, a navigation device for searching for a route to an arbitrary destination, and the like.

The output control unit 105 controls output of various pieces of information to the occupant of the own vehicle or the outside of the vehicle. For example, the output control unit 105 generates an output signal including at least one of visual information (for example, image data) or auditory information (for example, voice data) and supplies the output signal to the output unit 106, thereby controlling the output of the visual information and the auditory information from the output unit 106. Specifically, for example, the output control unit 105 combines image data captured by different image capturing devices of the data acquisition unit 102 to generate a bird's-eye image, a panoramic image, or the like, and supplies the output signal including the generated image to the output unit 106. Furthermore, for example, the output control unit 105 generates voice data including a warning sound, a warning message, or the like for dangers including collision, scrape, entry into a danger zone, and the like, and supplies the output signal including the generated voice data to the output unit 106.

The output unit 106 includes a device that can output visual information or auditory information to an occupant of the own vehicle or the outside of the vehicle. For example, the output unit 106 includes a display device, an instrument panel, an audio speaker, a headphone, a wearable device including a glasses-type display worn by an occupant and the like, a projector, a lamp, and the like. In addition to a device having a regular display, the display device included in the output unit 106 may be, for example, a device that displays visual information within the field of view of the driver, including a head-up display, a transmissive display, a device having an augmented reality (AR) display function, and the like.

The drive-affiliated control unit 107 generates various control signals and supplies the control signals to the drive-affiliated system 108, thereby controlling the drive-affiliated system 108. Furthermore, the drive-affiliated control unit 107 supplies a control signal to each unit other than the drive-affiliated system 108 as necessary, and performs notification of the control state of the drive-affiliated system 108, and the like.

The drive-affiliated system 108 includes drive-affiliated various devices of the own vehicle. For example, the drive-affiliated system 108 includes a driving force generation device for generating driving force including an internal combustion engine, driving motor, or the like, a driving force transmission mechanism for transmitting the driving force to wheels, a steering mechanism that adjusts the steering angle, a braking device that generates braking force, an antilock brake system (ABS), an electronic stability control (ESC), an electric power steering device, and the like.

The body-affiliated control unit 109 generates various control signals and supplies the control signals to the body-affiliated system 110, thereby controlling the body-affiliated system 110. Furthermore, the body-affiliated control unit 109 supplies a control signal to each unit other than the body-affiliated system 110 as necessary, and performs notification of the control state of the body-affiliated system 110, and the like.

The body-affiliated system 110 includes various body-affiliated devices equipped in the vehicle body. For example, the body-affiliated system 110 includes a keyless entry system, a smart key system, a power window device, a power seat, a steering wheel, an air conditioner, various lamps (for example, head lamp, reverse lamp, stop lamp, direction indicator lamp, fog lamp, and the like), and the like.

The storage unit 111 includes, for example, a read only memory (ROM), a random access memory (RAM), a magnetic storage device such as a hard disc drive (HDD), a semiconductor storage device, an optical storage device, an optical magnetic storage device, and the like. The storage unit 111 stores various programs, data, and the like to be used by each unit of the vehicle control system 100. For example, the storage unit 111 stores map data including a three-dimensional high-precision map such as a dynamic map, a global map that has precision lower than the high-precision map and covers a large area, a local map that includes information around the own vehicle, and the like.

The automated driving control unit 112 controls automated driving including autonomous traveling, driving assistance, or the like. Specifically, for example, the automated driving control unit 112 performs cooperative control aimed at implementing functions of an advanced driver assistance system (ADAS) including collision avoidance or impact mitigation of the own vehicle, follow-up traveling based on distance between vehicles, traveling while maintaining vehicle speed, collision warning of the own vehicle, lane deviation warning of the own vehicle, or the like. Furthermore, for example, the automated driving control unit 112 performs cooperative control aimed at automated driving and the like in which the vehicle autonomously travels without depending on the operation of the driver. The automated driving control unit 112 includes a detection unit 131, a self-position estimation unit 132, a situation analysis unit 133, a planning unit 134, and an operation control unit 135.

The detection unit 131 detects various types of information necessary for controlling automated driving. The detection unit 131 includes an outside-vehicle information detection unit 141, an inside-vehicle information detection unit 142, and a vehicle state detection unit 143.

The outside-vehicle information detection unit 141 performs detection processing on information outside the own vehicle on the basis of data or signals from each unit of the vehicle control system 100. For example, the outside-vehicle information detection unit 141 performs detection processing, recognition processing, and tracking processing on an object around the own vehicle, and detection processing on the distance to the object. The object to be detected includes, for example, a vehicle, a person, an obstacle, a structure, a road, a traffic light, a traffic sign, a road marking, and the like. Furthermore, for example, the outside-vehicle information detection unit 141 performs detection processing on the environment around the own vehicle. The surrounding environment to be detected includes, for example, weather, temperature, humidity, brightness, road surface condition, and the like. The outside-vehicle information detection unit 141 supplies data indicating a result of the detection processing to the self-position estimation unit 132, a map analysis unit 151, a traffic rule recognition unit 152, and a situation recognition unit 153 of the situation analysis unit 133, an emergency avoidance unit 171 of the operation control unit 135, and the like.

The inside-vehicle information detection unit 142 performs detection processing on information inside the vehicle on the basis of data or signals from each unit of the vehicle control system 100. For example, the inside-vehicle information detection unit 142 performs driver authentication processing and recognition processing, driver state detection processing, occupant detection processing, inside-vehicle environment detection processing, and the like. The driver state to be detected includes, for example, physical condition, awakened degree, concentration, fatigue, line-of-sight direction, and the like. The inside-vehicle environment to be detected includes, for example, temperature, humidity, brightness, smell, and the like. The inside-vehicle information detection unit 142 supplies data indicating the result of detection processing to the situation recognition unit 153 of the situation analysis unit 133, the emergency avoidance unit 171 of the operation control unit 135, and the like.

The vehicle state detection unit 143 performs detection processing on the state of the own vehicle on the basis of data or signals from each unit of the vehicle control system 100. The state of the own vehicle to be detected includes, for example, speed, acceleration level, steering angle, presence or absence and details of abnormality, driving operation state, power seat position and tilt, door lock state, state of other vehicle-mounted devices, and the like. The vehicle state detection unit 143 supplies data indicating the result of detection processing to the situation recognition unit 153 of the situation analysis unit 133, the emergency avoidance unit 171 of the operation control unit 135, and the like.

The self-position estimation unit 132 performs estimation processing on the position, orientation, and the like of the own vehicle on the basis of data or signals from each unit of the vehicle control system 100 such as the outside-vehicle information detection unit 141 and the situation recognition unit 153 of the situation analysis unit 133. Furthermore, the self-position estimation unit 132 generates a local map to be used for self-position estimation as necessary (hereinafter referred to as self-position estimation map). The self-position estimation map is, for example, a high-precision map using a technique such as simultaneous localization and mapping (SLAM). The self-position estimation unit 132 supplies data indicating a result of the estimation processing to the map analysis unit 151, the traffic rule recognition unit 152, and the situation recognition unit 153 of the situation analysis unit 133, and the like. Furthermore, the self-position estimation unit 132 stores the self-position estimation map in the storage unit 111.

The situation analysis unit 133 performs analysis processing on the own vehicle and the surrounding situation. The situation analysis unit 133 includes the map analysis unit 151, the traffic rule recognition unit 152, the situation recognition unit 153, and a situation prediction unit 154.

The map analysis unit 151 performs analysis processing on various maps stored in the storage unit 111, and constructs a map including information necessary for the processing of automated driving while using, as necessary, data or signals from each unit of the vehicle control system 100 such as the self-position estimation unit 132, and the outside-vehicle information detection unit 141. The map analysis unit 151 supplies the constructed map to the traffic rule recognition unit 152, the situation recognition unit 153, the situation prediction unit 154, and a route planning unit 161, a behavior planning unit 162, and an operation planning unit 163 of the planning unit 134, and the like.

The traffic rule recognition unit 152 performs recognition processing on traffic rules around the own vehicle on the basis of data or signals from each unit of the vehicle control system 100 such as the self-position estimation unit 132, the outside-vehicle information detection unit 141, and the map analysis unit 151. By the recognition processing, for example, the position and state of traffic lights around the own vehicle, detailed traffic regulation around the own vehicle, lanes that can be traveled, and the like are recognized. The traffic rule recognition unit 152 supplies data indicating a result of the recognition processing to the situation prediction unit 154 and the like.

The situation recognition unit 153 performs recognition processing on the situation of the own vehicle on the basis of data or signals from each unit of the vehicle control system 100 such as the self-position estimation unit 132, the outside-vehicle information detection unit 141, the inside-vehicle information detection unit 142, the vehicle state detection unit 143, and the map analysis unit 151. For example, the situation recognition unit 153 performs recognition processing on the situation of the own vehicle, the situation around the own vehicle, the situation of the driver of the own vehicle, and the like. Furthermore, the situation recognition unit 153 generates, as necessary, a local map to be used for recognizing the situation around the own vehicle (hereinafter referred to as situation recognition map). The situation recognition map is, for example, an occupancy grid map.

The situation of the own vehicle to be recognized includes, for example, the position, orientation, movement of the own vehicle (for example, speed, acceleration level, moving direction, and the like), the presence or absence and details of abnormality, and the like. The situation around the own vehicle to be recognized includes, for example, the type and position of a surrounding stationary object, the type, position, and movement of a surrounding moving object (for example, speed, acceleration level, moving direction, and the like), configuration of surrounding roads and road surface conditions, surrounding weather, temperature, humidity, brightness, and the like. The driver state to be recognized includes, for example, physical condition, awakened degree, concentration, fatigue, movement of line-of-sight, driving operation, and the like.

The situation recognition unit 153 supplies data indicating a result of the recognition processing (including situation recognition map, as necessary) to the self-position estimation unit 132, the situation prediction unit 154, and the like. Furthermore, the situation recognition unit 153 stores the situation recognition map in the storage unit 111.

The situation prediction unit 154 performs situation prediction processing regarding the own vehicle on the basis of data or signals from each unit of the vehicle control system 100 such as the map analysis unit 151, the traffic rule recognition unit 152, and the situation recognition unit 153. For example, the situation prediction unit 154 performs prediction processing on the situation of the own vehicle, the situation around the own vehicle, the situation of the driver, and the like.

The situation of the own vehicle to be predicted includes, for example, action of the own vehicle, occurrence of abnormality, distance to empty, and the like. The situation around the own vehicle to be predicted includes, for example, action of a moving object around the own vehicle, change in the state of traffic lights, change in the environment such as the weather, and the like. The situation of the driver to be predicted includes, for example, action and physical condition of the driver, and the like.

The situation prediction unit 154 supplies data indicating a result of the prediction processing to the route planning unit 161, the behavior planning unit 162, and the operation planning unit 163 of the planning unit 134, and the like together with data from the traffic rule recognition unit 152 and the situation recognition unit 153.

The route planning unit 161 plans a route to a destination on the basis of data or signals from each unit of the vehicle control system 100 such as the map analysis unit 151 and the situation prediction unit 154. For example, the route planning unit 161 sets a route from the current position to the designated destination on the basis of the global map. Furthermore, for example, the route planning unit 161 appropriately changes the route on the basis of the situation of traffic congestion, accident, traffic regulation, construction, and the like, physical condition of the driver, and the like. The route planning unit 161 supplies data indicating the planned route to the behavior planning unit 162 and the like.

The behavior planning unit 162 plans the behavior of the own vehicle for safely traveling the route planned by the route planning unit 161 within planned time on the basis of data or signals from each unit of the vehicle control system 100 such as the map analysis unit 151 and the situation prediction unit 154. For example, the behavior planning unit 162 plans start, stop, traveling direction (for example, forward, backward, left turn, right turn, turning, and the like), travel lane, travel speed, passing, and the like. The behavior planning unit 162 supplies data indicating the planned behavior of the own vehicle to the operation planning unit 163 and the like.

The operation planning unit 163 plans the operation of the own vehicle for implementing the behavior planned by the behavior planning unit 162 on the basis of data or signals from each unit of the vehicle control system 100 such as the map analysis unit 151 and the situation prediction unit 154. For example, the operation planning unit 163 plans acceleration, deceleration, travel locus, and the like. The operation planning unit 163 supplies data indicating the planned operation of the own vehicle to an acceleration-deceleration control unit 172, a direction control unit 173, and the like of the operation control unit 135.

The operation control unit 135 controls the operation of the own vehicle. The operation control unit 135 includes the emergency avoidance unit 171, the acceleration-deceleration control unit 172, and the direction control unit 173.

The emergency avoidance unit 171 performs detection processing on emergencies such as collision, scrape, entry into a danger zone, driver abnormality, and vehicle abnormality on the basis of a detection result by the outside-vehicle information detection unit 141, the inside-vehicle information detection unit 142, and the vehicle state detection unit 143. In a case where occurrence of an emergency is detected, the emergency avoidance unit 171 plans the operation of the own vehicle to avoid the emergency such as sudden stop or quick turning. The emergency avoidance unit 171 supplies data indicating the planned operation of the own vehicle to the acceleration-deceleration control unit 172, the direction control unit 173, and the like.

The acceleration-deceleration control unit 172 performs acceleration-deceleration control for implementing the operation of the own vehicle planned by the operation planning unit 163 or the emergency avoidance unit 171. For example, the acceleration-deceleration control unit 172 calculates a control target value for the driving force generation device or the braking device for implementing planned acceleration, deceleration, or sudden stop, and supplies the drive-affiliated control unit 107 with a control command indicating the calculated control target value.

The direction control unit 173 performs direction control for implementing the operation of the own vehicle planned by the operation planning unit 163 or the emergency avoidance unit 171. For example, the direction control unit 173 calculates a control target value for a steering mechanism for implementing a travel locus or quick turning planned by the operation planning unit 163 or the emergency avoidance unit 171, and supplies the drive-affiliated control unit 107 with a control command indicating the calculated control target value.

To perform higher-precision external recognition toward implementation of automated driving and ADAS, many external recognition sensors of different types are beginning to be installed in vehicles. Meanwhile, each sensor has its strong and weak points. For example, a camera that captures visible light is not good at dark places, and a radar that detects reflection of radio waves is not good at objects that do not easily reflect radio waves, such as persons and animals.

The strong and weak points of each sensor also depend on each detection principle. The strong and weak points of a radar (millimeter wave radar), a camera, and a laser radar (LiDAR) are summarized in Table 1 below. In the table, ⊙ means very strong point (having high precision), ○ means strong point (having good precision), and Δ means weak point (having insufficient precision). However, the detection principle of the radar is to reflect radio waves and measure the distance to an object and the like, the detection principle of the camera is to capture reflected visible light from a subject, and the detection principle of the LiDAR is to reflect light and measure the distance to an object and the like.

TABLE 1

| Sensor type | Radar | Camera | LiDAR |
| --- | --- | --- | --- |
| Measurement distance | ○ | Δ | ⊙ |
| Angle, resolution | Δ | ⊙ | ○ |
| Performance in bad weather | ⊙ | Δ | ○ |
| Performance at night | ⊙ | ○ | ⊙ |
| Classification of object | Δ | ⊙ | ○ |

Most of past sensor fusion technologies do not use data detected by a sensor whose recognition precision has deteriorated due to the change in the external environment and the like by supplementing the sensor whose recognition precision has decreased due to the change in the external environment with another sensor or by switching the combination of sensors to use.

However, even if the sensor has a low recognition precision, it does not mean that nothing can be recognized from detected data of the sensor. For example, a camera is not good at dark places, but it is possible to recognize to some extent an object in a nearby place or a place where street lights or city lights are illuminating from an image captured by the camera.

Therefore, the present specification proposes below the technology that further improves the recognition precision by effectively using detection signals from sensors with a low recognition precision from among a plurality of sensors mounted on vehicles such as a radar, a camera, and a LiDAR.

Figure 2:
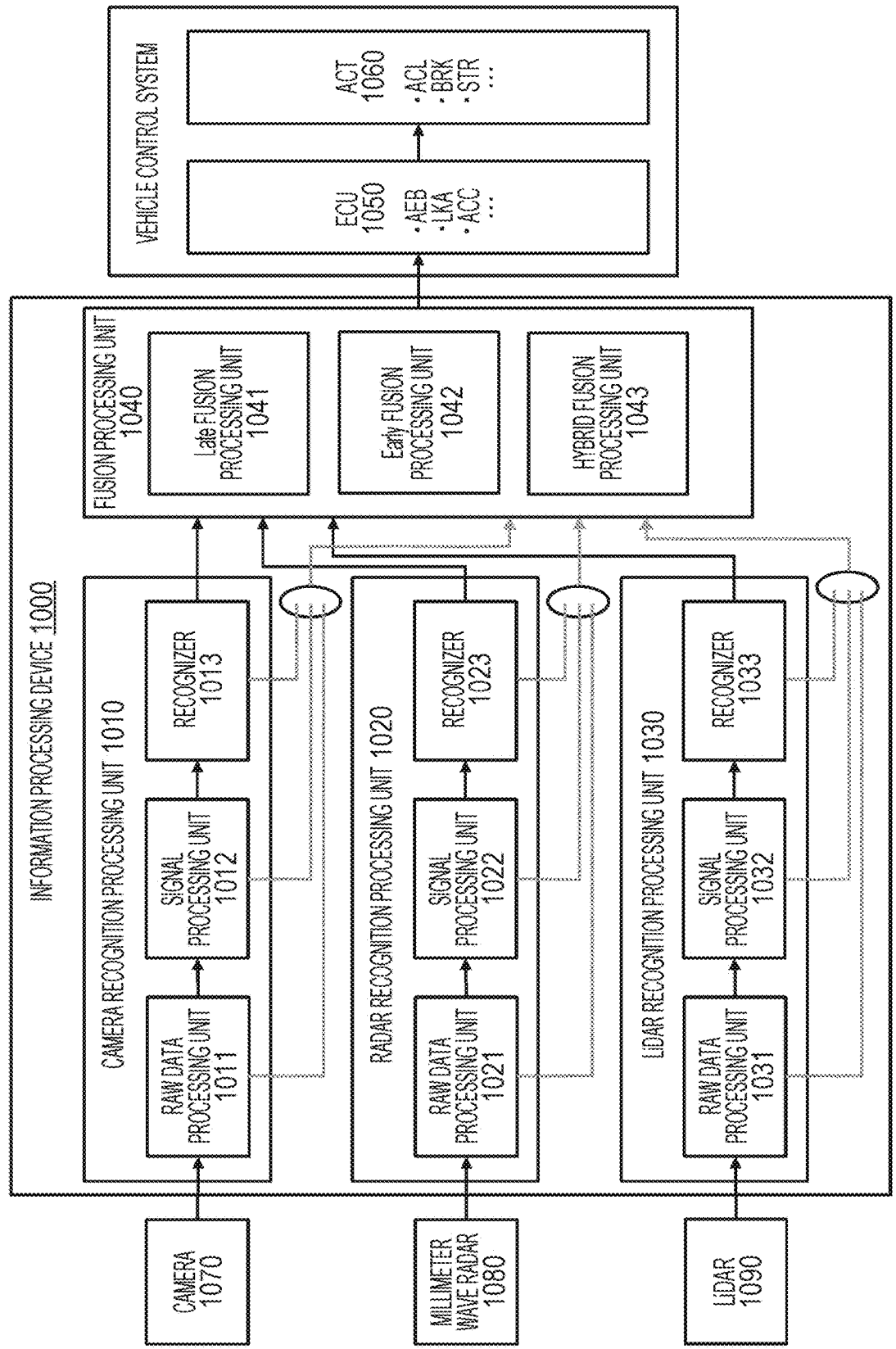
FIG. 2 is a diagram showing a functional configuration of an information processing device 1000.

FIG. 2 schematically shows a functional configuration of an information processing device 1000 to which the technology disclosed in the present specification is applied.

The illustrated information processing device 1000 includes a camera recognition processing unit 1010 that processes a detection signal of a camera 1070, a radar recognition processing unit 1020 that processes a detection signal of a millimeter wave radar 1080, a LiDAR recognition processing unit 1030 that processes a detection signal of a LiDAR 1090, and a fusion processing unit 1040 that performs fusion processing on a processing result by each of the recognition processing units 1010 to 1030 described above.

External recognition sensors such as the camera 1070, the millimeter wave radar 1080, and the LiDAR 1090 are mounted on the same vehicle after each installation position is calibrated such that detection ranges become almost the same. Furthermore, it is also assumed that external recognition sensors other than the sensors 1070 to 1090 described above are further mounted on the same vehicle. Furthermore, it is also assumed that the camera 1070 includes a plurality of cameras, and that at least part of the cameras is installed to be different from the millimeter wave radar 1080 and the LiDAR 1090 in detection range. Outputs of the plurality of cameras may undergo fusion processing by the fusion processing unit 1040.

The camera recognition processing unit 1010 includes a RAW data processing unit 1011 that processes RAW data input from the camera 1070, a signal processing unit 1012 that performs signal processing on the RAW data, and a recognizer 1013 that recognizes an object from a camera image after the signal processing. The RAW data mentioned here is data in which light information captured by an image sensor is recorded as it is. The RAW data processing unit 1011 performs front-end processing (amplification, noise removal, AD conversion, and the like) on the RAW data, and the signal processing unit 1012 performs back-end processing. The recognizer 1013 may be in either form of hardware that implements a predetermined image recognition algorithm or software that executes the recognition algorithm. The recognizer 1013 outputs information (target list) on shape classification of the recognized object (target). Examples of object shape classification recognized by the recognizer 1013 include a person, car, sign, sky, building, road, sidewalk, and the like. The recognizer 1013 may be in either form of hardware that implements a predetermined image recognition algorithm or software that executes the recognition algorithm.

As a recognition result by the recognizer 1013, the object shape classification (person, car, sign, sky, building, road, sidewalk, and the like) is output from the camera recognition processing unit 1010 to the subsequent-stage fusion processing unit 1040. However, the recognizer 1013 does not output a recognition result with low likelihood. Therefore, under situations where the recognition performance of the recognizer 1013 decreases, such as in bad weather or at night, an information amount output from the recognizer 1013 may decrease. Furthermore, in the present embodiment, early data before obtaining the final recognition result by the recognizer 1013 is also output to the fusion processing unit 1040. The early data mentioned here includes a captured image input from the camera 1070 (RAW data), output data and data during signal processing from the signal processing unit 1012, data during recognition by the recognizer 1013, and the like. All or part of the early data is output to the fusion processing unit 1040. Because of low likelihood of recognition, it is assumed that the data during recognition by the recognizer 1013 includes information regarding an object that is not finally output from the recognizer 1013 (for example, pedestrian information and the like that is hidden behind an object such as a car body or a fence and can be recognized only partially or fragmentarily). Hereinafter, the early data before recognition processing by the recognizer 1013 will be collectively referred to as "RAW data" of the camera 1070 for convenience.

Furthermore, the radar recognition processing unit 1020 includes a RAW data processing unit 1021 that processes RAW data input from the millimeter wave radar 1080, a signal processing unit 1022 that performs signal processing on the RAW data, and a recognizer 1023 that recognizes an object from a radar detection result after the signal processing. The recognizer 1023 may be in either form of hardware that implements a predetermined recognition algorithm or software that executes the recognition algorithm. The recognizer 1023 tracks the recognized target (person, car, sign, building, and the like) and outputs a recognition result such as a distance, angle of elevation, azimuth, speed, and reflection intensity of each target.

A final recognition result by the recognizer 1023 is output from the radar recognition processing unit 1020 to the subsequent-stage fusion processing unit 1040. However, the recognizer 1013 does not output a recognition result with low likelihood. Therefore, it is assumed that information output from the recognizer 1023 regarding objects with weak radar reflection intensity such as a nonmetal will decrease. Furthermore, in the present embodiment, early data before obtaining the final recognition result by the recognizer 1023 is also output to the fusion processing unit 1040. The early data mentioned here includes a captured image input from the millimeter wave radar 1080 (RAW data), output data and data during signal processing from the signal processing unit 1022, data during recognition by the recognizer 1023, and the like. All or part of the early data is output to the fusion processing unit 1040. Because of low likelihood of recognition, it is assumed that the data during recognition by the recognizer 1023 includes information that is not finally output from the recognizer 1023 (for example, a motorcycle and the like whose reflection intensity is weakened by influence of reflected radio waves from a nearby object such as fence or signboard). Hereinafter, the early data before recognition processing by the recognizer 1023 will be collectively referred to as "RAW data" of the millimeter wave radar 1080 for convenience.

Furthermore, the LiDAR recognition processing unit 1030 includes a RAW data processing unit 1031 that processes RAW data input from the LiDAR 1090, a signal processing unit 1032 that performs signal processing on the RAW data, and a recognizer 1033 that recognizes an object from a LiDAR detection result after the signal processing. The recognizer 1033 may be in either form of hardware that implements a predetermined recognition algorithm or software that executes the recognition algorithm. The recognizer 1033 tracks the recognized target (person, car, sign, building, and the like) and outputs a recognition result such as a distance, angle of elevation, azimuth, height, and reflectivity of each target.

A final recognition result by the recognizer 1033 is output from the LiDAR recognition processing unit 1030 to the subsequent-stage fusion processing unit 1040. However, the recognizer 1013 does not output a recognition result with low likelihood. Furthermore, in the present embodiment, early data before obtaining the final recognition result by the recognizer 1033 is also output to the fusion processing unit 1040. The early data mentioned here includes a captured image input from the LiDAR 1090 (RAW data), output data and data during signal processing from the signal processing unit 1032, data during recognition by the recognizer 1033, and the like. All or part of the early data is output to the fusion processing unit 1040. Because of low likelihood of recognition, it is assumed that the data during recognition by the recognizer 1033 includes information that is not finally output from the recognizer 1033 (pedestrian information that can be recognized only partially or fragmentarily) and the like. Hereinafter, the early data before recognition processing by the recognizer 1033 will be collectively referred to as "RAW data" of the LiDAR 1090 for convenience.

FIG. 2 schematically depicts the configuration of each of the recognition processing units 1010 to 1030 for convenience. It is to be understood that the detailed internal configuration is determined depending on the type of sensor, the model and design specification of the sensor, and the like. For example, configurations are also assumed in which some or all components of the camera recognition processing unit 1010 are mounted in the unit of the camera 1070, some or all components of the radar recognition processing unit 1020 are mounted in the unit of the millimeter wave radar 1080, or some or all components of the LiDAR recognition processing unit 1030 are mounted in the unit of the LiDAR 1090.

Furthermore, in a case where an external recognition sensor (not shown) other than the camera 1070, the millimeter wave radar 1080, and the LiDAR 1090 are mounted on the same vehicle, the information processing device 1000 may further include a recognition processing unit including a RAW data processing unit, a signal processing unit, and a recognizer for recognition processing based on a detection signal of the sensor. In these cases as well, the final recognition result is output from each recognition processing unit to the subsequent-stage fusion processing unit 1040, and the RAW data of the sensor is output.

Furthermore, although there is a tendency for a plurality of external recognition sensors to be mounted on a vehicle toward implementation of automated driving and ADAS (as described above), of course, it is also assumed that only one external recognition sensor among the camera 1070, the millimeter wave radar 1080, and the LiDAR 1090 is mounted on one vehicle. For example, it is also assumed that the millimeter wave radar 1080 is not used in a case where sufficient external recognition performance can be obtained with only the LiDAR 1090, and it is assumed that a video captured by the camera 1070 is used only for viewing and not for external recognition. In such a case, it is to be understood that the information processing device 1000 is equipped with only the functional module corresponding to the sensor to use among the recognition processing units 1010 to 1030 described above, or that all the functional modules corresponding to each sensor are equipped, but only the corresponding functional module (or functional module having an input signal from the sensor) operates and sends an output to the subsequent-stage fusion processing unit 1040.

The fusion processing unit 1040 performs fusion processing on the recognition result based on each sensor of the camera 1070, the millimeter wave radar 1080, and the LiDAR 1090 mounted on the same vehicle to perform external recognition. In a case where still another external recognition sensor (not shown) is mounted on the same vehicle, the fusion processing unit 1040 also performs further fusion processing on a detection signal from the sensor. In the present embodiment, the fusion processing unit 1040 performs fusion processing not only on the recognition result of each sensor but also on the RAW data before recognition to perform external recognition. Then, the fusion processing unit 1040 outputs an external recognition result obtained by performing the fusion processing to the vehicle control system.

In the example shown in FIG. 2, the vehicle control system includes an electronic control unit (ECU) 1050 and an actuator (hereinafter referred to as "ACT") 1060 that moves the vehicle. The ECU 1050 makes determination for automated driving or driving assistance, for example, adaptive cruise control (ACC), lane departure warning (LDW), lane keeping assist (LKA), autonomous emergency braking (AEB), and blind spot detection (BSD) on the basis of the external recognition result by the fusion processing unit 1040. Then, the ACT 1060 performs drive control on each drive unit, that is, operation of the vehicle, such as active cornering light (ACL), brake actuator (BRK), and steering gear (STR), in accordance with an instruction from the ECU 1050. For example, in a case where a road lane is recognized by the fusion processing unit 1040, the vehicle control system controls the travel of the vehicle to prevent the vehicle from deviating from the lane. Furthermore, in a case where an obstacle such as a surrounding vehicle, pedestrian, roadside fence or signboard is recognized by the fusion processing unit 1040, the vehicle control system controls the travel of the vehicle to allow the vehicle to avoid a collision with the obstacle. Automated driving generally includes three steps: "cognition→determination→operation". The cognitive step recognizes that there is some object, and the determination step determines what is recognized to determine a route plan of the vehicle. In the configuration example shown in FIG. 2, processing of the cognitive step is mainly performed in the information processing device 1000, processing of the determination step is mainly performed by the ECU 1050 in the vehicle control system, and processing of the operation step is mainly performed by the ACT 1060. However, distinction between the cognitive step and the determination step is not strict, and a part of the cognitive step described in the present embodiment may be positioned as the determination step. Furthermore, in the future, design is also expected in which some or all of functions of processing the cognitive step will be the mounted in each sensor unit such as the camera 1070, the millimeter wave radar 1080, and the LiDAR 1090.

In the present embodiment, the fusion processing unit 1040 includes a late fusion processing unit 1041, an early fusion processing unit 1042, and a hybrid fusion processing unit 1043. The late fusion processing unit 1041 performs fusion processing on the final output (late data) by each of the recognition processing units 1010 to 1030, that is, on the recognition result by each of the recognizers 1013, 1023, and 1033 to perform external recognition. Furthermore, the early fusion processing unit 1042 performs fusion processing on early data before the recognition distance by each of the recognition processing units 1010 to 1030, that is, on RAW data of each sensor of the camera 1070, the millimeter wave radar 1080, and the LiDAR 1090 (as described above) to perform external recognition. Furthermore, the hybrid fusion processing unit 1043 performs fusion processing on either one or more of the final output (late data) by each of the recognition processing units 1010 to 1030 and RAW data of either one or more of the recognition processing units 1010 to 1030 to perform external recognition. Even if likelihood of the final recognition result by the recognizer of a sensor is low, the hybrid fusion processing unit 1043 has an effect of enhancing the recognition performance by the fusion processing with RAW data of another sensor or the same sensor. Then, the fusion processing unit 1040 further performs fusion processing on the recognition results of the late fusion processing unit 1041, the early fusion processing unit 1042, and the hybrid fusion processing unit 1043, or selectively selects the recognition result of the fusion processing units 1041 to 1043, and outputs the processing result to the subsequent-stage ECU 1050.

The late fusion processing unit 1041, which obtains the final recognition results by the recognizers 1013, 1023, and 1033 from the recognition processing units 1010 to 1030, respectively, processes information with high reliability of the recognition results. However, there is a problem that the information amount that can be used is small because only the recognition results with high likelihood is output from the recognizers 1013, 1023, and 1033 and only the information with high reliability can be obtained.

Meanwhile, since the early fusion processing unit 1042 obtains the RAW data from the recognition processing units 1010 to 1030 before passing through the recognizers 1013, 1023, and 1033, respectively, the information amount to be input is very large. However, the RAW data or data close to the RAW data contains noise. For example, when the camera 1070 captures an image of a dark place at night, various information items other than an object is included, increasing the possibility of erroneous detection and decreasing the reliability of the information. Furthermore, since the information amount is large, the processing amount is also large.

Figure 3:
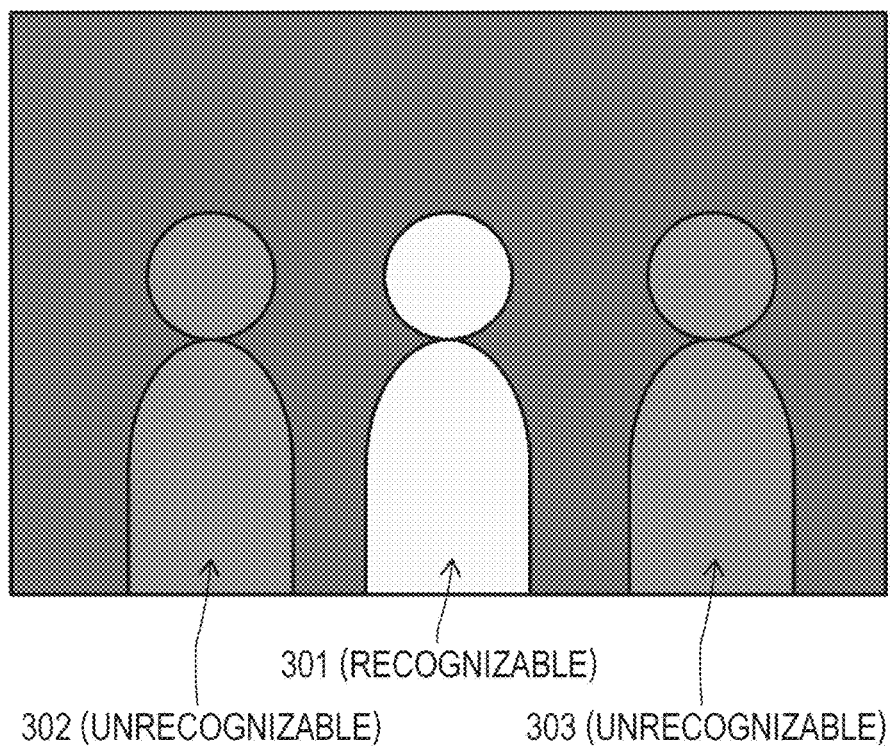
FIG. 3 is a diagram illustrating an image captured by a camera.

For example, it is assumed that when the camera 1070 captures an image of a dark place at night, the captured image (that is, RAW data) contains images of a plurality of persons, as shown in FIG. 3. Since a pedestrian 301, who is reflected by street lights and the like and brightly projected, can be recognized at a high recognition rate, the recognizer 1013 outputs a result of recognizing the pedestrian 301 as a target. Meanwhile, pedestrians 302 and 302, who are darkly projected without being exposed to street lights and the like, have a low recognition rate, and the recognizer 1013 outputs a result of not recognizing such pedestrians 302 and 302 as a target. That is, although the plurality of pedestrians 301 to 303 is projected in the original camera image (that is, RAW data), only information with high reliability is output by passing through the recognizer 1013, and the information amount is narrowed down. Therefore, only information on the pedestrian 301 with high reliability is input into the late fusion processing unit 1041, and unnecessary information such as noise is omitted, but information on the pedestrians 302 and 303 with low reliability is also omitted. Meanwhile, information on all the pedestrians 301 to 303 is input into the early fusion processing unit 1042, and various information items such as noise is also input.

Furthermore, the RAW data of a detection result of the millimeter wave radar 1080 includes intensity distribution of reflected radio wave at a position where each reflecting object exists (direction and distance) in a predetermined detection range forward of a receiving unit of the reflected radio wave. The RAW data contains intensity data of reflected radio waves from various objects. However, when passing through the recognizer 1033, the intensity data with low reflection intensity of radio wave is omitted, only numerical information such as the direction, distance (including depth and width), and speed of the recognized target is extracted, and the information amount is narrowed down.

Figure 4:
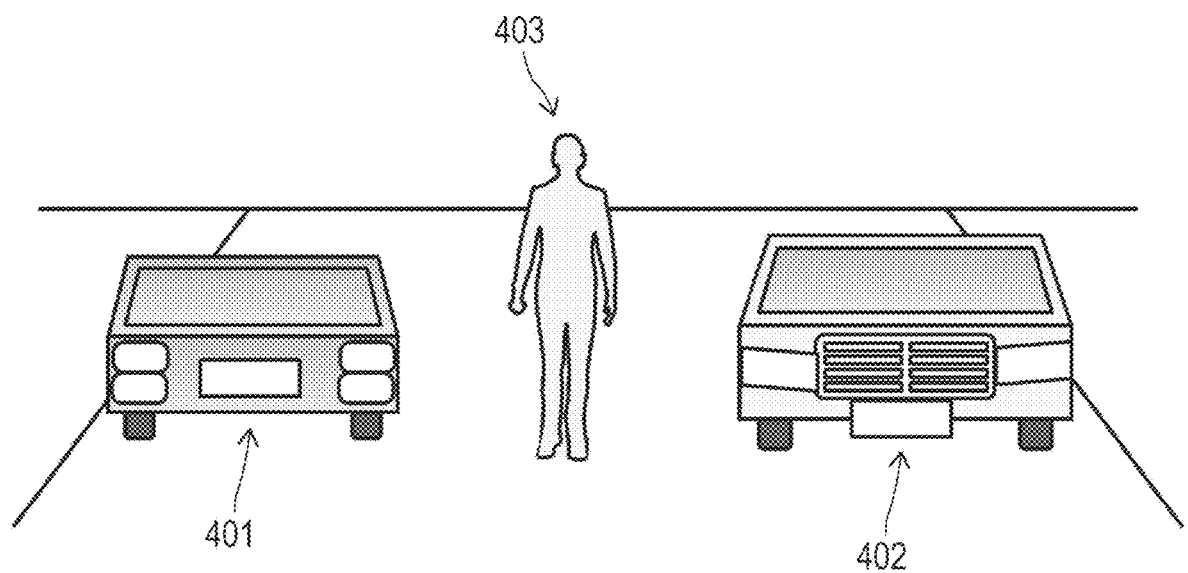
FIG. 4 is a diagram illustrating a scene detected by a millimeter wave radar.
Figure 5:
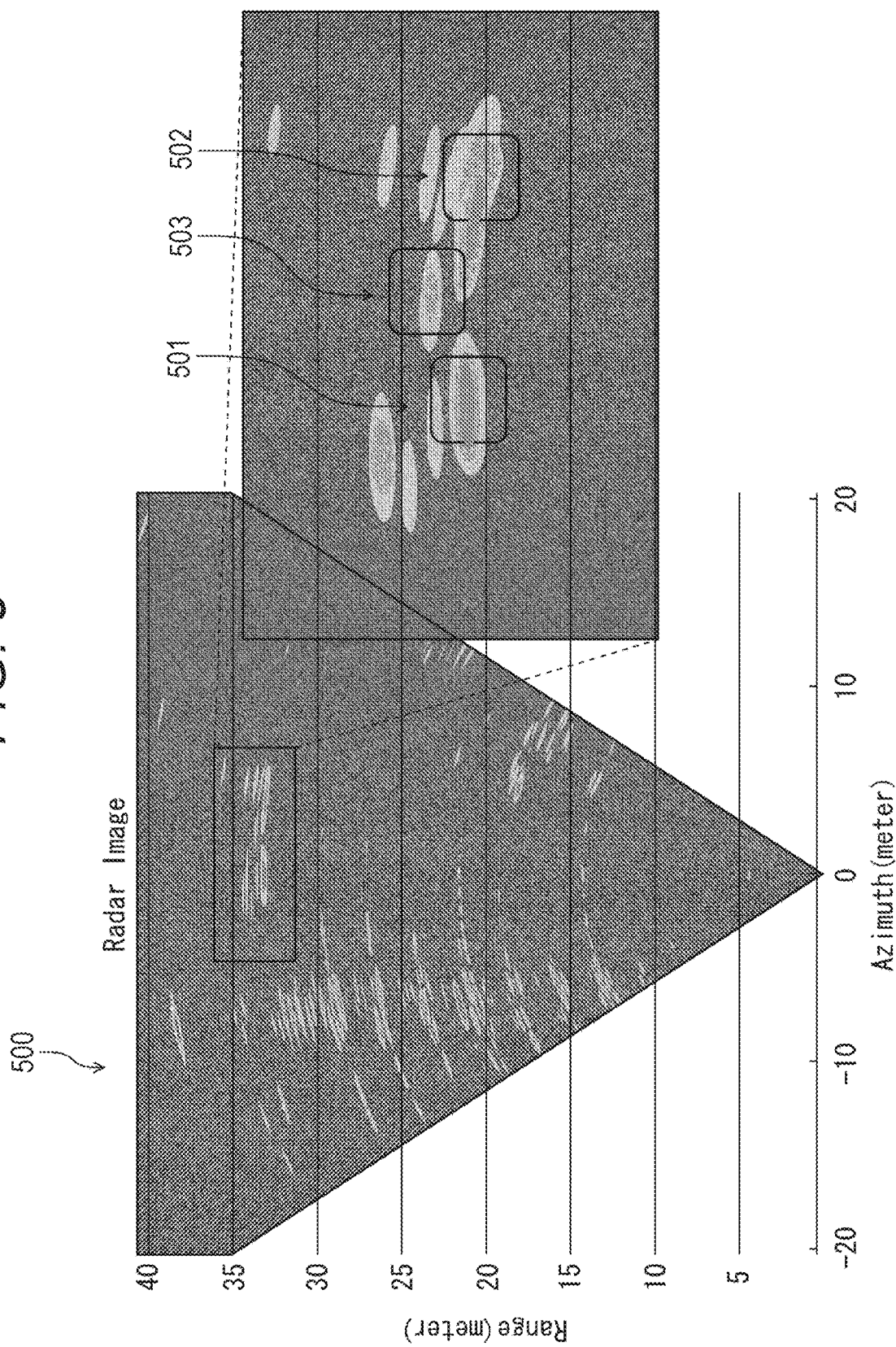
FIG. 5 is a diagram showing a result of detecting the scene shown in FIG. 4 with the millimeter wave radar.

For example, as shown in FIG. 4, in a scene where a pedestrian 403 is walking between two vehicles 401 and 402, it is desirable to be able to detect the pedestrian 403 as well as the vehicles 401 and 402. However, in a case where the millimeter wave radar 1080 is used, the reflection intensity of an object sandwiched between strong reflectors tends to be weakened. Therefore, when the scene as shown in FIG. 4 is measured with the millimeter wave radar 1080, as shown in FIG. 5, RAW data 500 contains strong reflected waves 501 and 502 from the vehicles 401 and 402, respectively, and a weak reflected wave 503 from the pedestrian 403. If the detection result of such a millimeter wave radar 1080 passes through the recognizer 1033, the reflected wave 503 with low reliability as information is omitted, and only the reflected waves 501 and 502 with high reliability are recognized as targets, and thus the information amount is narrowed down. Therefore, only information on the vehicles 401 and 402 with high reliability is input into the late fusion processing unit 1041, and unnecessary information such as noise is omitted. However, information on the pedestrian 403 with low reliability is also omitted. Meanwhile, information on the pedestrian 403 as well as the vehicles 401 and 402 is input into the early fusion processing unit 1042, but various information items such as noise is also input.

In short, the result obtained by performing fusion processing on the recognition result of each of the recognizers 1013, 1023, and 1033 by the late fusion processing unit 1041 is narrowed down to information with high reliability. Therefore, there is a possibility that information with low reliability but high importance may be omitted. Meanwhile, the result obtained by performing fusion processing on the RAW data of each of the recognition processing units 1010 to 1030 by the early fusion processing unit 1042 has a large amount of information, but there is a possibility that information with low reliability such as noise may be taken in.

Therefore, the information processing device 1000 according to the present embodiment is configured to obtain an external recognition result having a sufficient information amount and high reliability by supplementing the processing result of the late fusion processing unit 1041 having high reliability but narrowed down information amount with the processing result of the early fusion processing unit 1042 having a large information amount but also noise. Furthermore, the hybrid fusion processing unit 1043 performs fusion processing on either one or more of the final outputs (late data) of each of the recognition processing units 1010 to 1030 and the RAW data of either one or more of the recognition processing units 1010 to 1030. Even if the final recognition result by the recognizer of one sensor has low likelihood, the hybrid fusion processing unit 1043 can improve the recognition performance by fusion processing with the RAW data of another sensor or the same sensor. That is, the information processing device 1000 is configured to restore important information that will be omitted by the recognizers 1013, 1023, or 1033 on the basis of the result of fusion processing on the RAW data of each external recognition sensor such as the camera 1070, the millimeter wave radar 1080, and the LiDAR 1090 by the early fusion processing unit 1042.

Note that at the technical level at the time of the present application, the precision of external recognition by the LiDAR 1090 is significantly higher than the precision of a camera or millimeter wave radar. However, the recognition result by the LiDAR recognition processing unit 1030 may be subjected to fusion processing by the late fusion processing unit 1041 together with the recognition result of another recognition processing unit 1010 or 1020, and the recognition result by the LiDAR recognition processing unit 1030 may be supplemented with the processing result of the RAW data by the early fusion processing unit 1042. Furthermore, the LiDAR recognition processing unit 1030 may be subjected to fusion processing by the hybrid fusion processing unit 1043 together with the recognition result of another recognition processing unit 1010 or 1020. In addition, in a case where only the recognition result by the recognizer 1033 of the LiDAR recognition processing unit 1030 is sufficient, the late fusion processing unit 1041 does not have to perform fusion processing on the recognition results of the recognizers 1013 and 1023 of the camera recognition processing unit 1010 and the radar recognition processing unit 1020, respectively, or the RAW data.

Meanwhile, at the technical level at the time of the present application, the LiDAR 1090 is extremely more expensive than other external recognition sensors such as the camera 1070 and the millimeter wave radar 1080. Therefore, without using the LiDAR 1090 (in other words, without mounting the LiDAR 1090 on the vehicle), the information processing device 1000 may be configured to supplement the results of fusion processing of the recognition result by the recognizers 1013 and 1023 of the camera recognition processing unit 1010 and the radar recognition processing unit 1020, respectively, by the late fusion processing unit 1040, with the result of fusion processing of the RAW data of each of the camera 1070 and the millimeter wave radar 1080 by the early fusion processing unit 1042.

Furthermore, from the nature of the LiDAR 1090 using reflected waves of light, there is a concern that the reliability will deteriorate in the weather that blocks light such as rainfall, snowfall, and fog, and in dark places such as at night and in tunnels. Furthermore, similar concerns apply to the camera 1070. Meanwhile, the reliability of the millimeter wave radar 1080 is not so dependent on the weather and is relatively stable. Therefore, the information processing device 1000 may adjust the specific gravity when the fusion processing unit 1040 performs fusion processing on the information from each of the sensors 1070 to 1090 on the basis of environmental information such as the weather and other external information. For example, in fine weather, the late fusion processing unit 1041 and the early fusion processing unit 1042 in the fusion processing unit 1040 use the recognition result by the recognizer 1033 of the LiDAR recognition processing unit 1030 and the RAW data of the LiDAR 1090 with high importance. In a case where there is rainfall, snowfall, or fog, or in dark places such as at night or in tunnels, fusion processing is performed by using with low importance or not using the recognition result by the recognizer 1033 of the LiDAR recognition processing unit 1030 and the RAW data of the LiDAR 1090.

Figure 6:
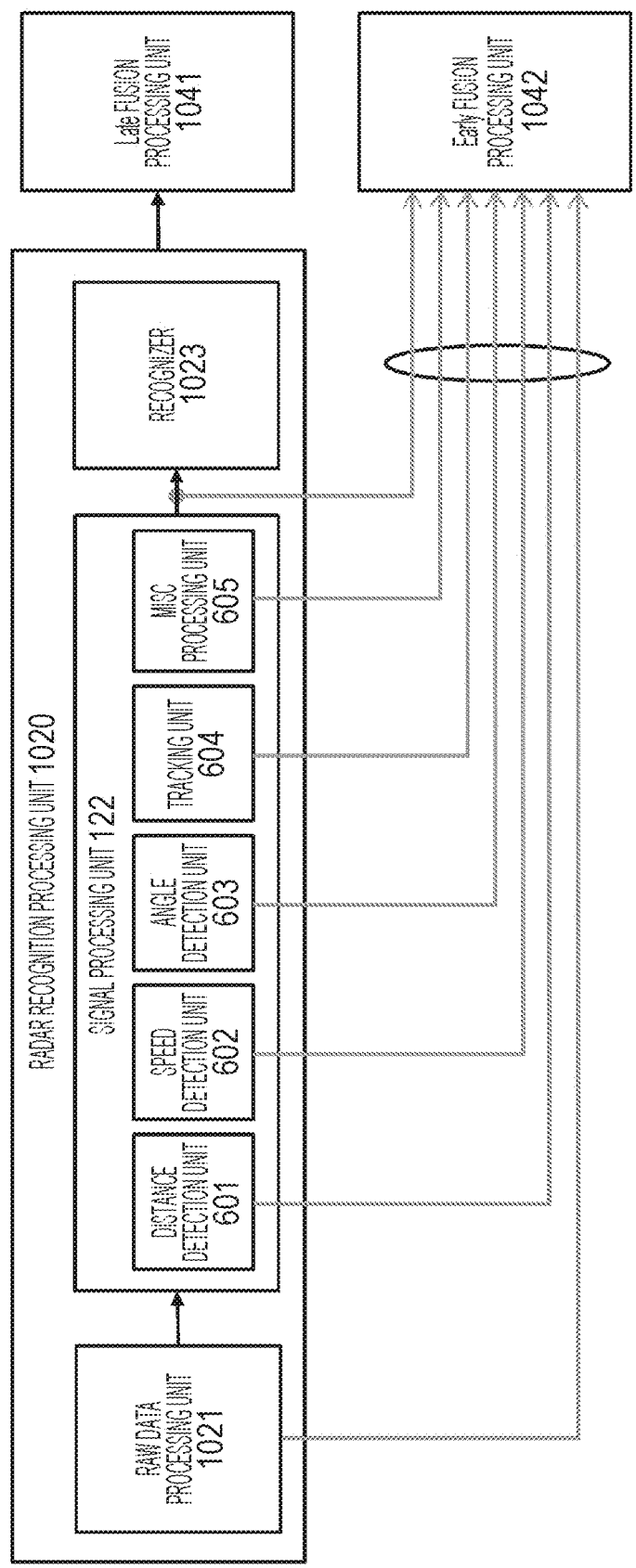
FIG. 6 is a diagram showing an internal configuration example of a radar recognition processing unit 1020.

FIG. 6 shows an internal configuration example of the radar recognition processing unit 1020. The radar recognition processing unit 1020 includes the RAW data processing unit 1021, the signal processing unit 1022, and the recognizer 1023.

The RAW data processing unit 1021 inputs the RAW data of the millimeter wave radar 1080 and performs processing such as amplification, noise removal, and AD conversion. The RAW data or data after either of amplification, noise removal, or AD conversion is output from the RAW data processing unit 1021 to the early fusion processing unit 1042.

In the example shown in FIG. 6, the signal processing unit 1022 includes a distance detection unit 601 that detects the distance to each target captured by radar, a speed detection unit 602 that detects the speed at which each target moves, an angle detection unit 603 that detects the orientation of each target, a tracking unit 604 that tracks the target, and a MISC processing unit 605 that performs other processing. An algorithm for detecting the distance, orientation, size, and speed of the target from the RAW data of the millimeter wave radar 1080 is not particularly limited. For example, an algorithm developed by the manufacturer of the millimeter wave radar 1080 and the like may be applied as it is.

When all the processing of respective units 601 to 605 is completed in the signal processing unit 1022, target information with the distance, orientation, size, speed, and the like detected by radar is output to the subsequent-stage recognizer 1023. Furthermore, target information of which the distance, orientation, size, and speed cannot be detected accurately is not output to the recognizer 1023 as unrecognizable and is omitted. Furthermore, a signal processed by at least one functional module of respective units 601 to 605 is also output to the early fusion processing unit 1042.

Note that order in which respective units 601 to 605 perform processing on input data from the RAW data processing unit 1021 is not necessarily fixed, and it is assumed that the order will be changed as appropriate according to product design specifications and the like. Furthermore, not all of the functional modules 601 to 605 described above are essential for the detection signal of the millimeter wave radar 1080. It is also assumed that the functional modules 601 to 605 are selected according to the product design specifications and the like, or the signal processing unit 1022 will be equipped with a functional module other than the illustrated functional modules.

The recognizer 1023 performs external recognition processing on the basis of the signal after processing by the signal processing unit 1022 according to the predetermined recognition algorithm.

Figure 7:
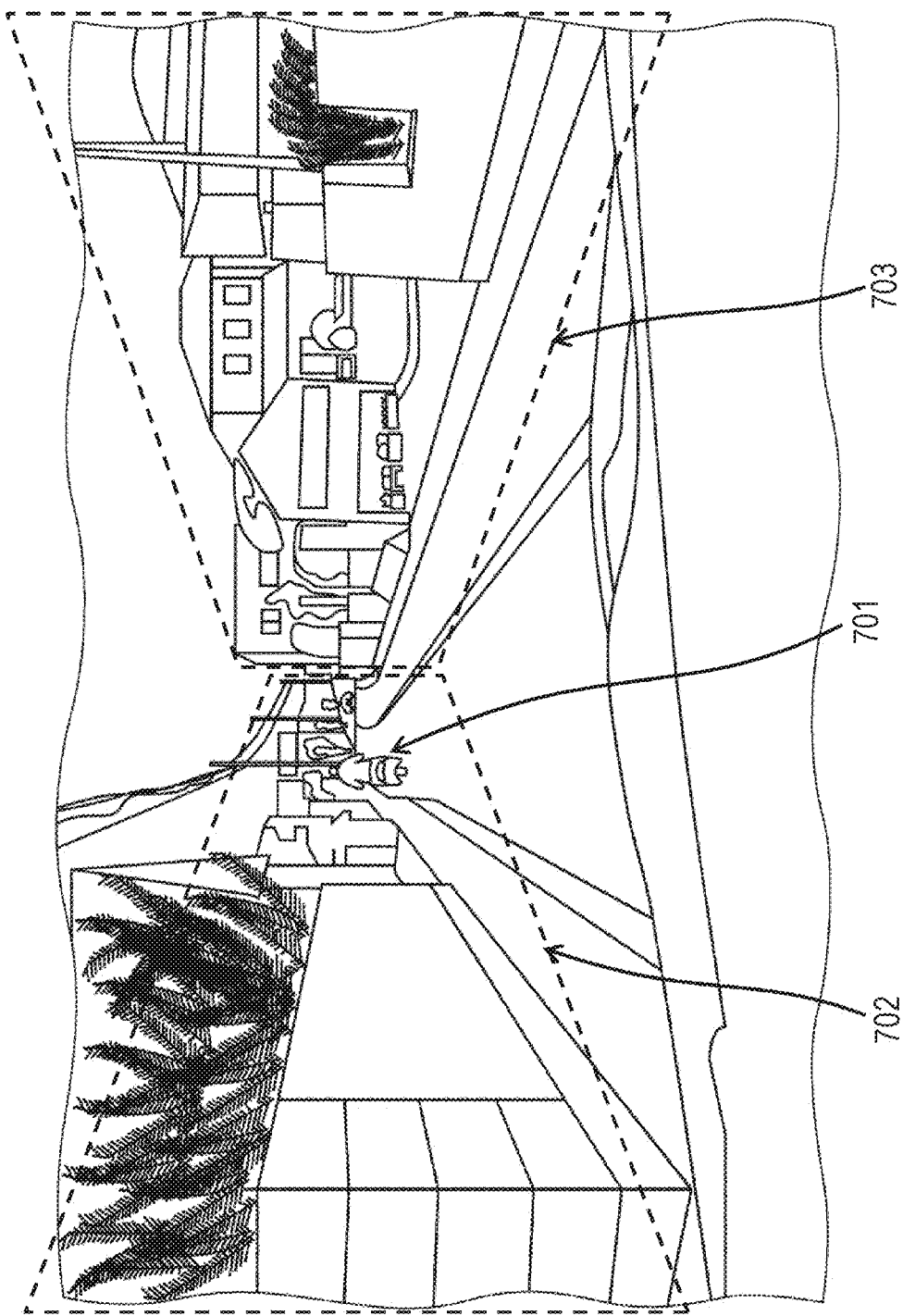
FIG. 7 is a view showing one example of a scene to be recognized.
Figure 8:
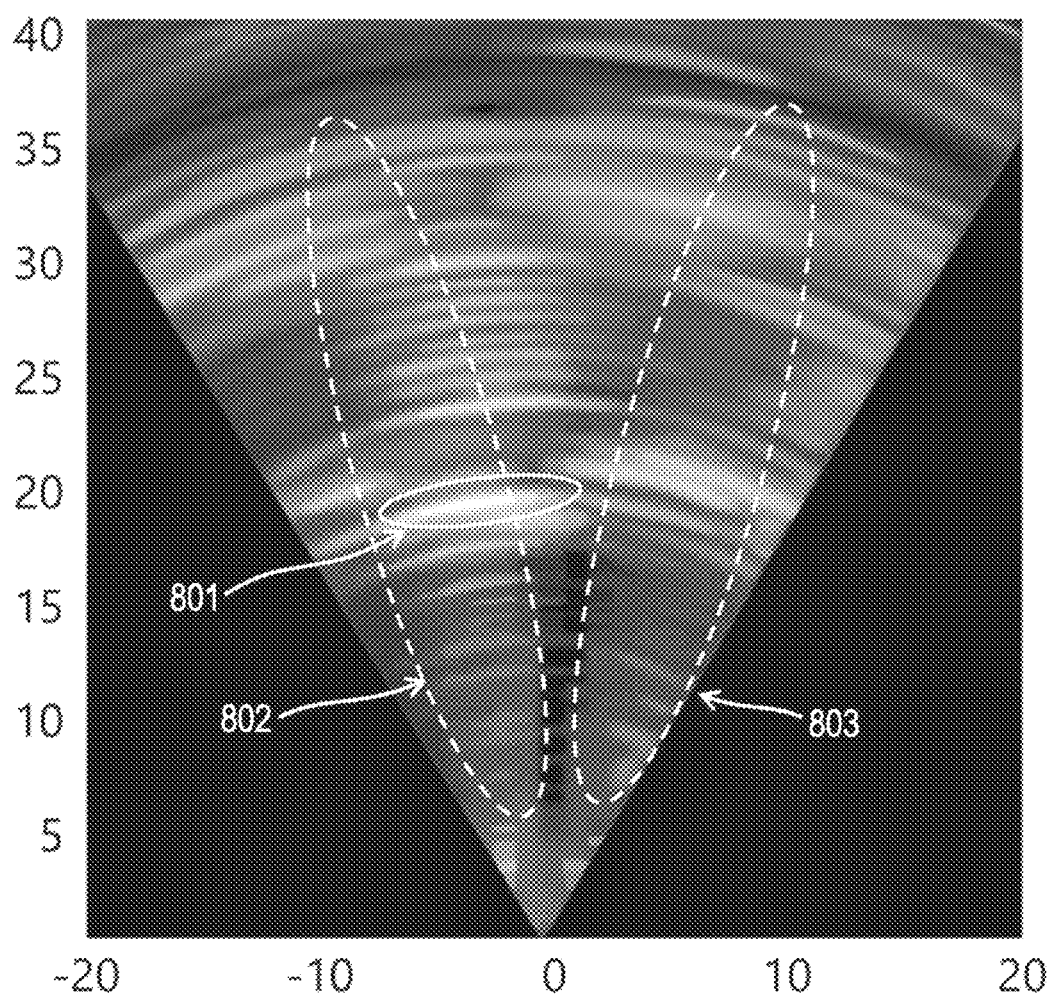
FIG. 8 is a diagram showing data before recognition processing on the scene shown in FIG. 7.
Figure 9:
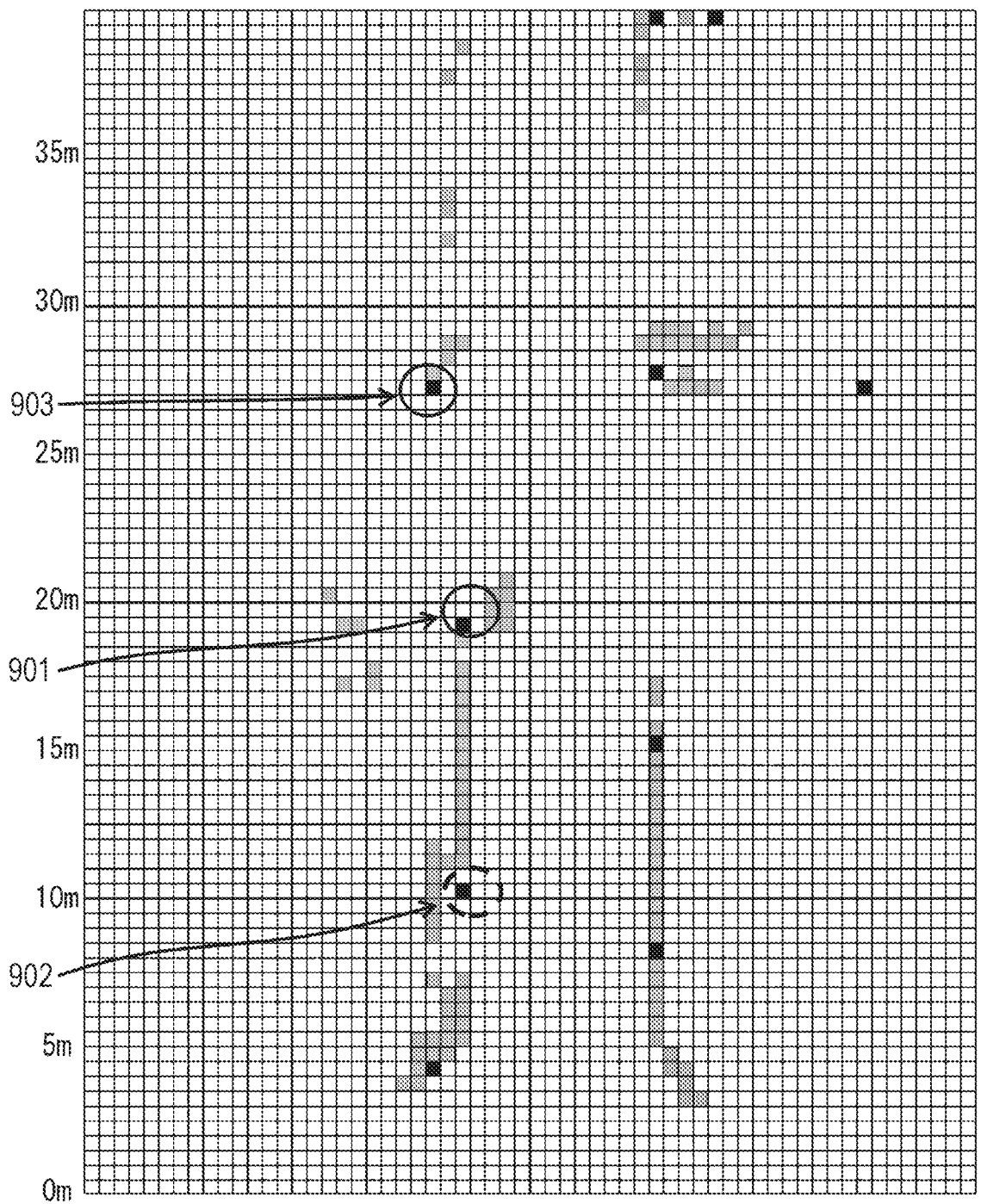
FIG. 9 is a diagram showing data after recognition processing on the scene shown in FIG. 7.

For example, in a scene where an image captured by the vehicle-mounted camera 1070 is the street as shown in FIG. 7, data before processing by the recognizer 1023 of the radar recognition processing unit 1020 is shown in FIG. 8, and data after recognition processing by the recognizer 1023 is shown in FIG. 9. However, FIG. 8 is an image of the RAW data of the millimeter wave radar 1080 or data during processing by the signal processing unit 1022. Furthermore, FIG. 9 shows the recognition result by the recognizer 1023 of the radar recognition processing unit 1020 with black blocks. For comparison, FIG. 9 also shows the recognition result by the recognizer 1033 of the LiDAR recognition processing unit 1030 with gray blocks.

Figure 21:
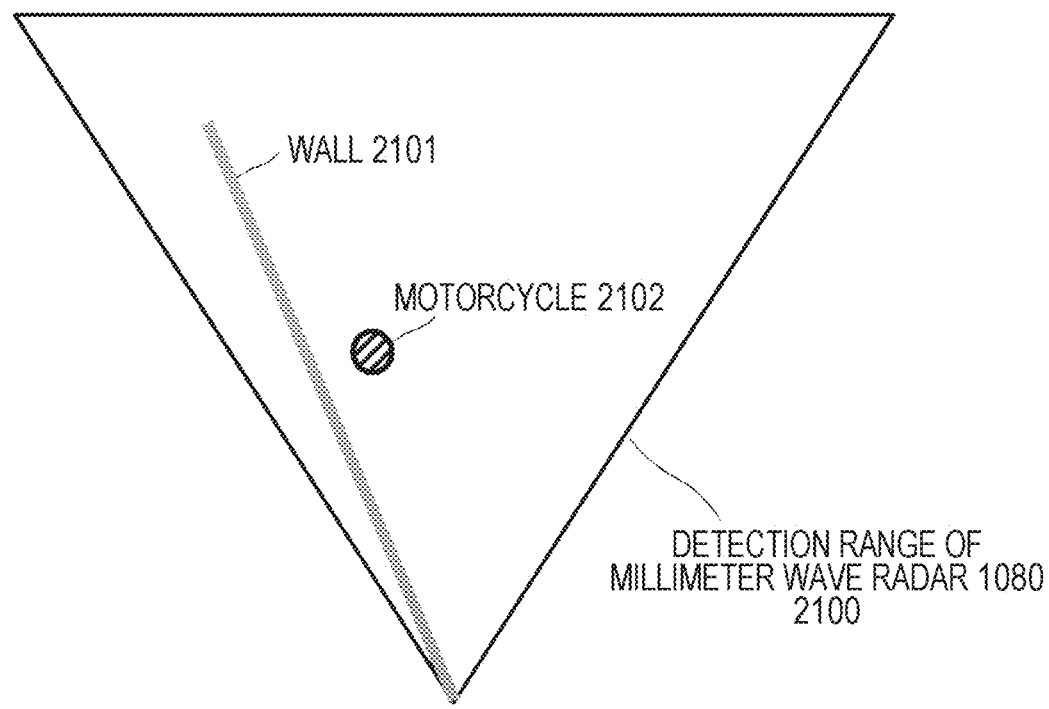
FIG. 21 is a diagram for describing processing of recognizing an object that cannot be recognized by a recognizer 1023 on the basis of RAW data of a millimeter wave radar 1080.
Figure 22:
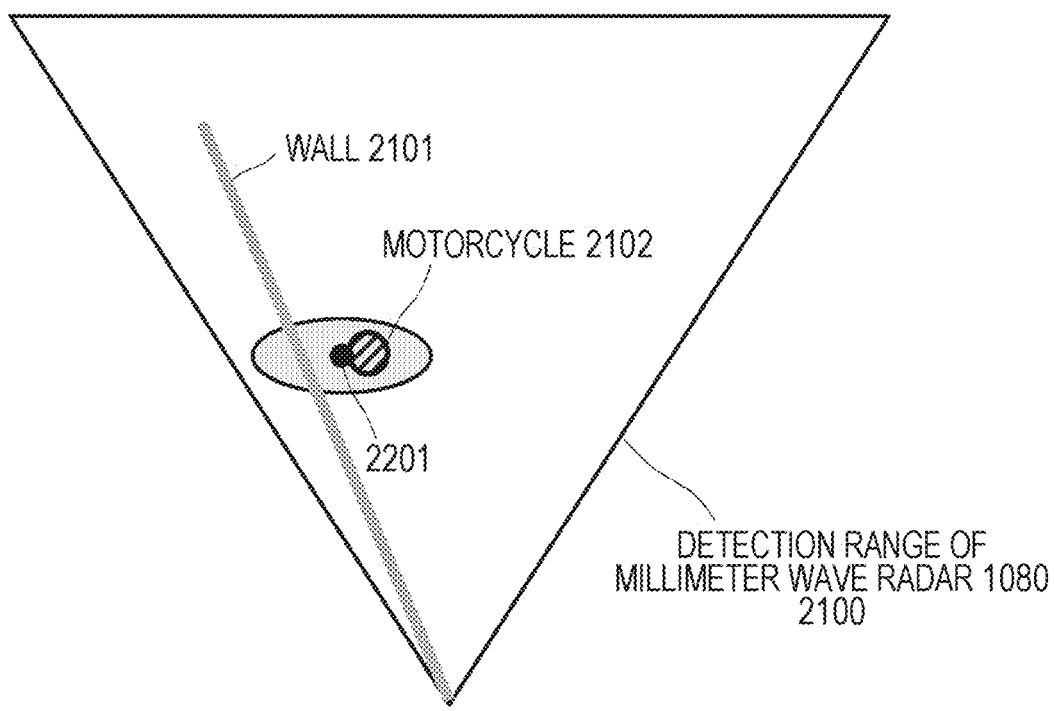
FIG. 22 is a diagram for describing the processing of recognizing the object that cannot be recognized by the recognizer 1023 on the basis of the RAW data of the millimeter wave radar 1080.
Figure 23:
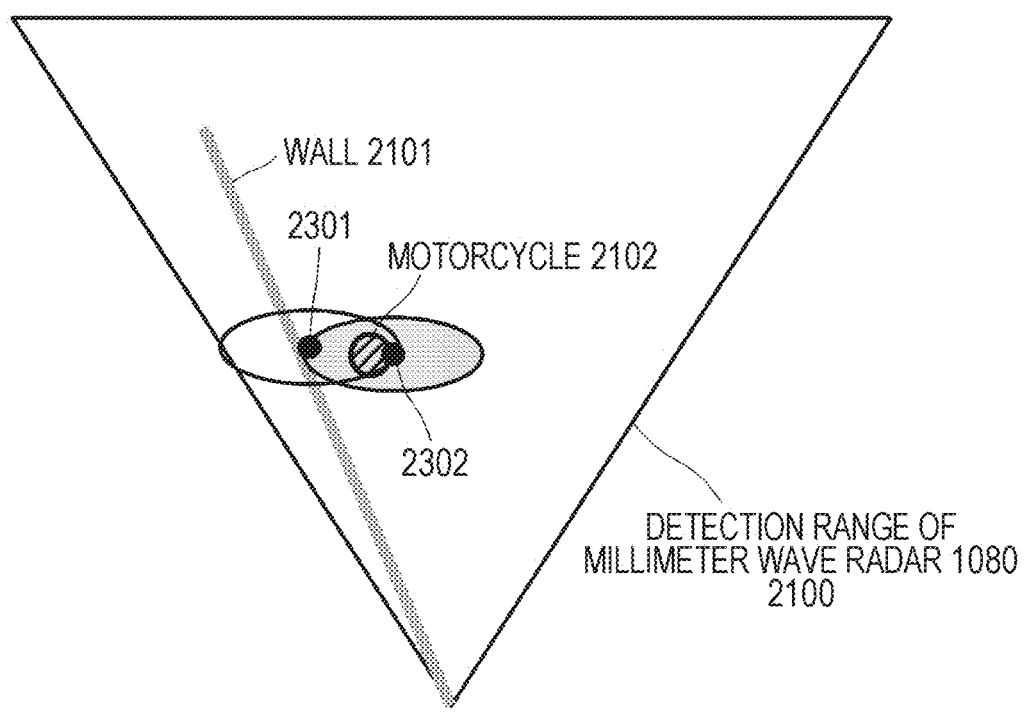
FIG. 23 is a diagram for describing the processing of recognizing the object that cannot be recognized by the recognizer 1023 on the basis of the RAW data of the millimeter wave radar 1080.

In the scene shown in FIG. 7, it is preferable that a motorcycle 701 traveling on a road forward of the vehicle can be recognized as an obstacle. However, houses and fences 702 and 703 are lined up on both sides of the road (or motorcycle 701). As shown in FIG. 8, the RAW data of the millimeter wave radar 1080 before processing by the recognizer 1023 contains various information items. Although the RAW data of the millimeter wave radar 1080 has side lobes, a strong reflection 801 from the motorcycle 701 can be confirmed. Note that relatively weak reflections 802 and 803 from the left and right fences and the like can also be confirmed. The millimeter wave radar 1080 has high sensitivity to metal, meanwhile has low sensitivity to nonmetal such as concrete. These objects with weak reflection intensity cannot be recognized after passing through the recognizer 1023, but the existence can be confirmed from the RAW data. Furthermore, with reference to the recognition result by the recognizer 1023 of the radar recognition processing unit 1020 shown in FIG. 9, together with an object 901 that seems to correspond to the motorcycle 701 near 20 meters ahead, objects 902 and 903 that seem to correspond to the houses and fences 702 and 703 are also recognized on both sides of the road (or motorcycle 701). In particular, in the RAW data, the recognized object 901 and the recognized object 902 overlap each other, but since the data has not undergone recognition processing, even if reflection intensity is weak, the recognized object 901 and the recognized object 902 are recognized in the data. Therefore, the fusion of the RAW data and the recognition result of the recognizer 1023 makes it possible to recognize the recognized object 901 and the recognized object 902 as separate objects. Of course, there are many scenes in which the motorcycle can be recognized only by the recognizer 1023 of the millimeter wave radar 1080. However, the reflection intensity of the motorcycle is weaker than the reflection intensity of the vehicle. As shown in FIG. 7, if there are other reflectors near the motorcycle, it will be difficult to capture the motorcycle with only the millimeter wave radar 1080. In data after recognition processing for recognizing fruits with a certain reflection intensity or higher, the recognized object 901 and the recognized object 902 are output as one block of data. FIG. 21 schematically shows how a motorcycle 2102 is approaching a wall 2101 within a detection range 2100 of the millimeter wave radar 1080. FIG. 22 schematically shows a result of recognizing the reflected wave of the millimeter wave radar 1080 obtained from the detection range 2100 with the recognizer 1023. With the recognizer 1023, the reflection intensity less than a predetermined value is omitted, and the reflection intensity equal to or greater than the predetermined value is recognized as an object. Therefore, in the example shown in FIG. 22, one lump 2201 in which the wall 2101 and the motorcycle 2102 are integrated is recognized as an object. In contrast, from the RAW data of the millimeter wave radar 1080, even a weak reflection intensity as will be omitted by the recognizer 1023 can be recognized. Therefore, as shown in FIG. 23, it is possible to recognize the reflection from the wall 2101 and the reflection from the motorcycle 2102 as separate objects 2301 and 2302.

Figure 10:
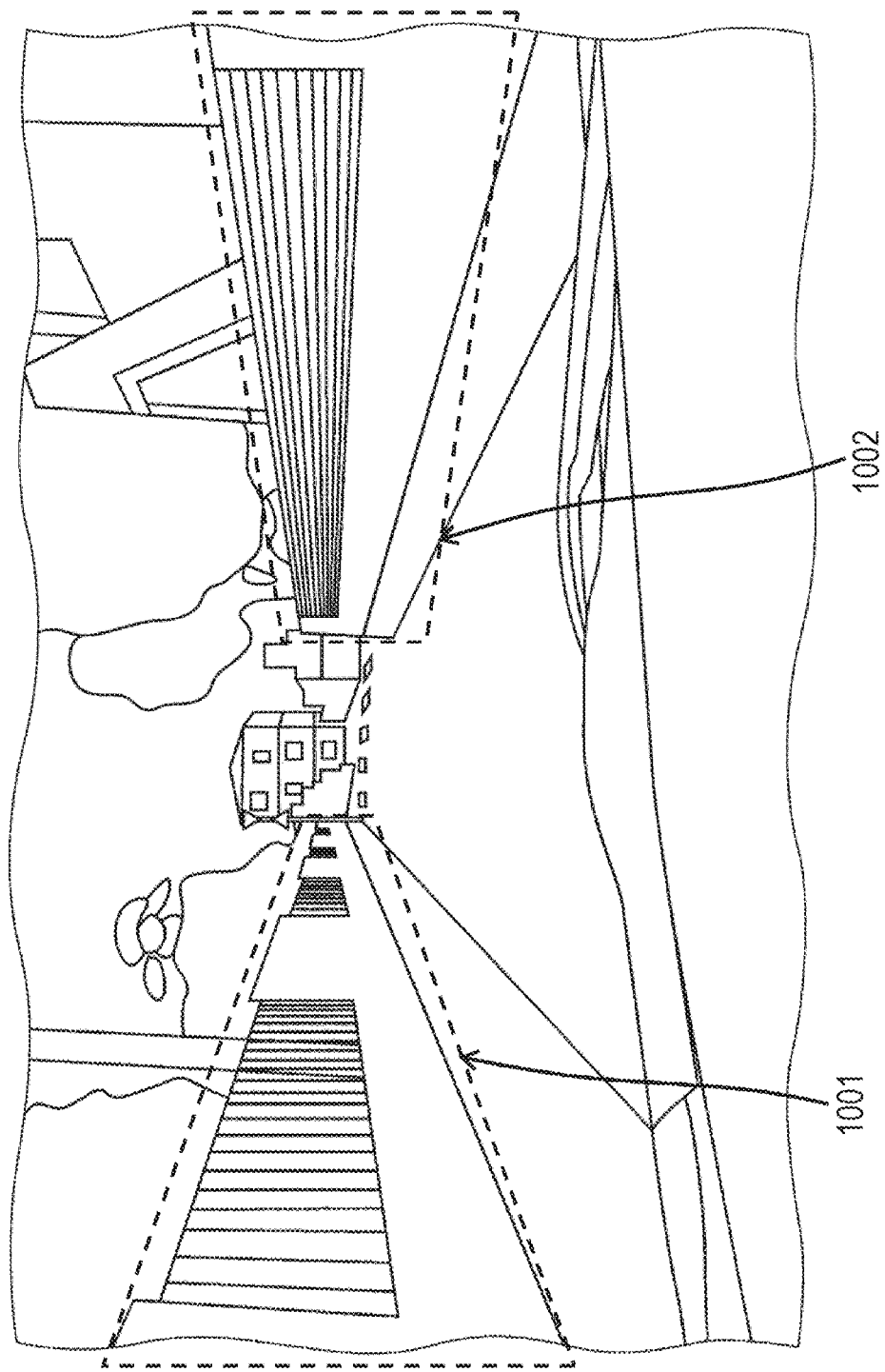
FIG. 10 is a view showing another example of the scene to be recognized.
Figure 11:
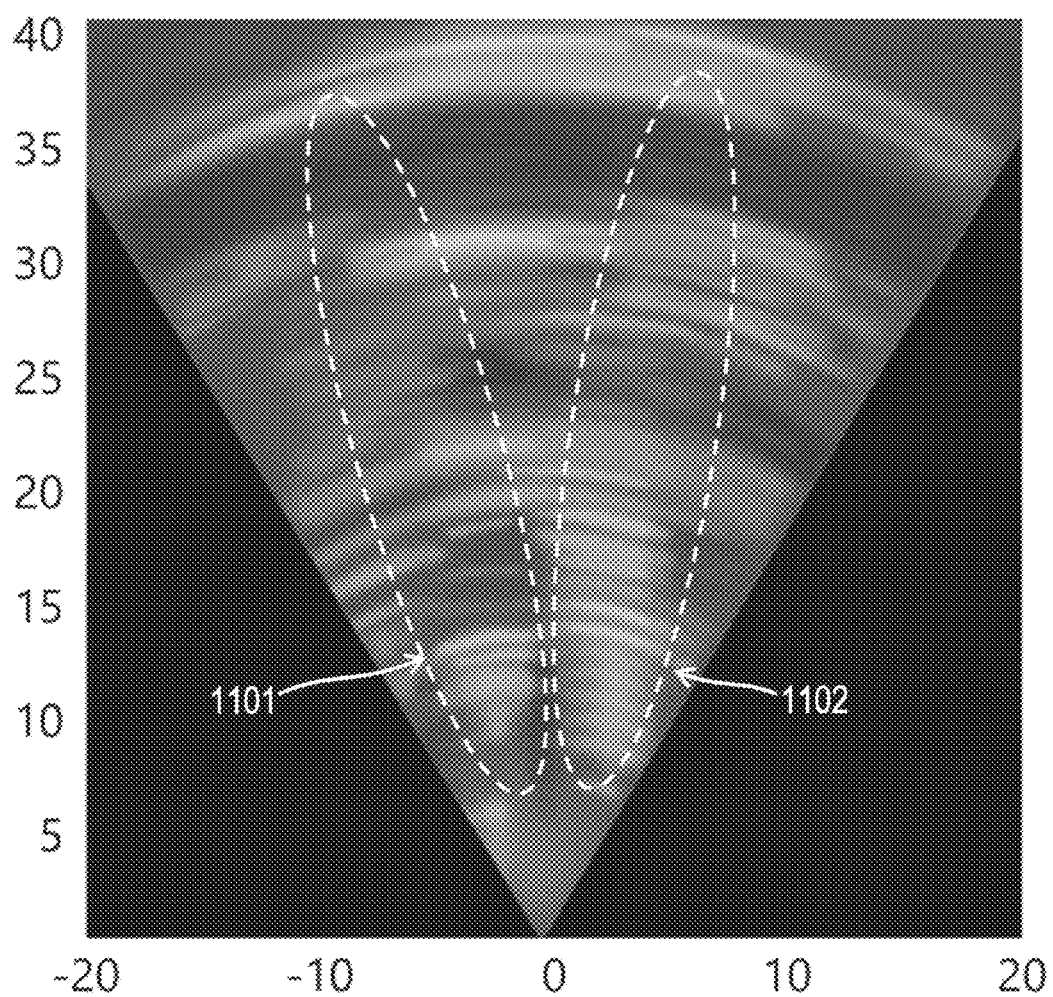
FIG. 11 is a diagram showing data before recognition processing on the scene shown in FIG. 10.
Figure 12:
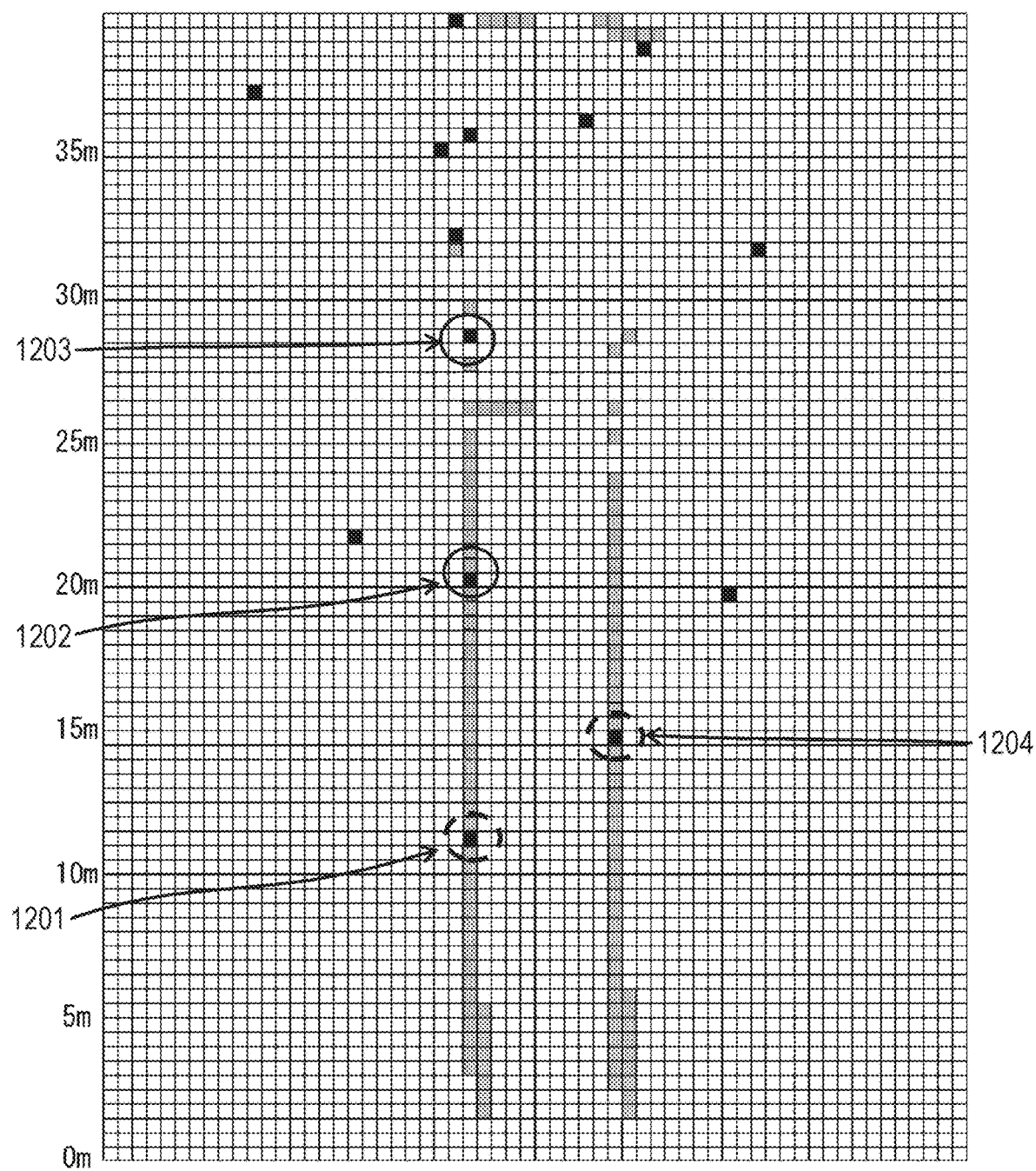
FIG. 12 is a diagram showing data after recognition processing on the scene shown in FIG. 10.

Furthermore, in a scene where an image captured by the vehicle-mounted camera 1070 is the street as shown in FIG. 10, data before processing by the recognizer 1023 of the radar recognition processing unit 1020 is shown in FIG. 11, and data after recognition processing by the recognizer 1023 is shown in FIG. 12. However, FIG. 11 is an image of the RAW data of the millimeter wave radar 1080 or data during processing by the signal processing unit 1022. Furthermore, FIG. 12 shows the recognition result by the recognizer 1023 of the radar recognition processing unit 1020 with black blocks. For comparison, FIG. 12 shows the recognition result by the recognizer 1033 of the LiDAR recognition processing unit 1030 with gray blocks together.

FIG. 10 is a scene of traveling in a narrow alley sandwiched between fences 1001 and 1002 on both sides, and it is preferable that the fences 1001 and 1002 on both sides can be recognized as obstacles. As shown in FIG. 11, the RAW data of the millimeter wave radar 1080 before processing by the recognizer 1023 contains various information items. The fences 1001 and 1002 themselves are not metal and are difficult to be captured by the millimeter wave radar 1080, but reflections 1101 and 1102 that are thought to be caused by cracks or steps in the fences 1001 and 1002 can be confirmed. Furthermore, with reference to the recognition result by the recognizer 1023 of the radar recognition processing unit 1020 shown in FIG. 12, the recognizer 1023 can discretely recognize only some parts 1201 to 1204 where there are reflections from cracks or steps scattered on respective fences 1001 and 1002. However, it is difficult to recognize the fences 1001 and 1002 as a whole, and it is difficult to recognize the fences 1001 and 1002 as a whole without using the recognition result of the recognizer 1033 of the LiDAR 1090 (that is, fusion processing). Meanwhile, from the RAW data shown in FIG. 11, even if the reflected waves are weak, the reflection information 1101 and 1102 indicating the existence of the fences can be acquired.

FIG. 13 shows an example of target recognition results when the late fusion processing unit 1041 performs fusion processing on the recognition results of the camera recognition processing unit 1010 and the radar recognition processing unit 1020 in the information processing device 1000. However, "◯" is entered in the recognition result that the target is recognized, and "X" is entered in the recognition result that the target is not recognized. In a case where the same target is subjected to recognition processing by each of the camera recognition processing unit 1010 and the radar recognition processing unit 1020, four patterns are assumed: in a case where both processing units can recognize the target (pattern 1), in a case where only one processing unit can recognize the target (patterns 2 and 3), or in a case where neither can recognize the target (pattern 4). The late fusion processing unit 1041 outputs the target that can be recognized by both the camera recognition processing unit 1010 and the radar recognition processing unit 1020 as recognizable (in FIG. 13, "◯" is entered). Meanwhile, the target that can be recognized by only one of the camera recognition processing unit 1010 and the radar recognition processing unit 1020, and the target that can be recognized by neither are output as unrecognizable (in FIG. 13, "X" is entered).

Meanwhile, FIG. 14 shows an example of target recognition results when the early fusion processing unit 1042 performs fusion processing on the RAW data of the camera 1070 and the millimeter wave radar 1080 in the information processing device 1000. However, in respective patterns 1 to 4 in FIG. 14, recognition of the same target as in the corresponding patterns in FIG. 13 is attempted. Furthermore, "◯" is entered in the recognition result that the target is recognized, and "X" is entered in the recognition result that the target is not recognized. There is also an object that is omitted at a determination threshold for the recognizer 113 or 123 by late fusion processing, but that can be recognized by early fusion processing using RAW data before omission at the determination threshold. However, it should be noted that an object with different recognition results between late fusion processing and early fusion processing has low likelihood of being an actual object.

In pattern 1 where the target can be recognized by both the recognizer 1013 of the camera recognition processing unit 1010 and the recognizer 1023 of the radar recognition processing unit 1020, the target can be similarly recognized with the RAW data of the camera 1070 and the RAW data of the millimeter wave radar 1080. Therefore, the early fusion processing unit 1042 outputs that the target can be recognized (in FIG. 14, "◯" is entered). That is, in a case where there is no difference between the recognition result by the recognizers 1013 and 1023 and the recognition result by the RAW data, the early fusion processing unit 1042 outputs the recognition result similar to the recognition result of the late fusion processing unit 1041.

Furthermore, in pattern 2 where the target can be recognized by the recognizer 1013 of the camera recognition processing unit 1010 but cannot be recognized by the recognizer 1023 of the radar recognition processing unit 1020, in a case where the target can be recognized on the basis of the RAW data of the millimeter wave radar 1080, the early fusion processing unit 1042 outputs that the target can be recognized. For example, in a case where the reflection intensity is weak and the target that is omitted by the recognizer 1023 can be recognized on the basis of the RAW data, and the like. Therefore, even a target that cannot be recognized by the late fusion processing unit 1041 can be recognized by using the early fusion processing unit 1042 (see FIG. 15). It can be said that the recognition rate of the target is improved by early fusion processing using RAW data with abundant information amount.

Furthermore, in pattern 3 where the target cannot be recognized by the recognizer 1013 of the camera recognition processing unit 1010 but can be recognized by the recognizer 1023 of the radar recognition processing unit 1020, in a case where the target still cannot be recognized from the RAW data of the camera 1070, the early fusion processing unit 1042 outputs that the target cannot be recognized. That is, in pattern 3, the early fusion processing unit 1042 outputs the recognition result similar to the recognition result of the late fusion processing unit 1041.

Furthermore, in pattern 4 where the target cannot be recognized by the recognizer 1013 of the camera recognition processing unit 1010 and the recognizer 1023 of the radar recognition processing unit 1020, in a case where the target still cannot be recognized from the RAW data of the camera 1070 but the target can be recognized on the basis of the RAW data of the millimeter wave radar 1080, the early fusion processing unit 1042 outputs a result that there is a possibility that the target exists. For example, in a case where the reflection intensity is weak and the target that is omitted by the recognizer 1023 can be recognized on the basis of the RAW data, and the like. Therefore, even a target that cannot be recognized by the late fusion processing unit 1041 can be recognized by using the early fusion processing unit 1042 (see FIG. 16). It can be said that the recognition rate of the target is improved by early fusion processing using RAW data with abundant information amount. However, even by early fusion processing, the recognition rate is not high enough, and thus "Δ" instead of "◯" is entered.

Therefore, in the example shown in FIG. 14, in each of pattern 2 and pattern 4, it can be said that the recognition rate of the target is improved by supplementing the processing result of the late fusion processing unit 1041 using the final recognition result that has high reliability but narrows down the information amount on the basis of the result processed by the early fusion processing unit 1042 using the RAW data with a large amount of information but also noise However, as in the case of pattern 1 and pattern 3 in FIG. 14, even if the early fusion processing unit 1042 is used, the recognition result by the late fusion processing unit 1041 does not change in some cases. If the early fusion processing unit 1042 is always operating, there is a concern about adverse effects such as an increase in processing load and an increase in power consumption of the information processing device 1000. Therefore, the recognition processing of the early fusion processing unit 1042 may be activated only in a case where necessary.

FIG. 17 schematically shows the configuration example of the information processing device 1000 configured to perform early fusion processing adaptively. However, in FIG. 17, the same functional module as shown in FIG. 1 is denoted with the same reference number.

A determination processing unit 1701 in the fusion processing unit 1042 determines whether or not the RAW data of the millimeter wave radar 1080 is necessary. In a case where the RAW data is necessary, the determination processing unit 1701 requests the radar recognition processing unit 1020 to output the RAW data of the millimeter wave radar 1080. For example, the determination processing unit 1701 compares the recognition results of the recognizer 1013 of the camera recognition processing unit 1010 and the recognizer 1023 of the radar recognition processing unit 1020. In a case where the recognition results correspond to pattern 2 or pattern 4 in FIG. 13, the determination processing unit 1701 determines that the RAW data is also necessary, and requests the radar recognition processing unit 1020 to output the RAW data of the millimeter wave radar 1080. Alternatively, the determination processing unit 1701 inputs environmental information such as weather or other external information. When a phenomenon is detected in which the recognition rate of the recognizers 1013 and the 1033 of the camera recognition processing unit 1010 and the LiDAR recognition processing unit 1030 decreases (or reliability of recognition deteriorates), such as rainfall, snowfall, fog, and dark places such as at night or in tunnels, the determination processing unit 1701 may request the radar recognition processing unit 1020 to output the RAW data of the millimeter wave radar 1080.

In response to the request from the determination processing unit 1701, the radar recognition processing unit 1020 outputs the RAW data of the millimeter wave radar 1080. Then, the early fusion processing unit 1042 uses the RAW data to perform early fusion processing, or the hybrid fusion processing unit 1043 uses the RAW data to perform hybrid fusion processing. Then, in addition to the recognition result by the late fusion processing unit 1041, with reference to the recognition result by the early fusion processing unit 1042 or the hybrid fusion processing unit 1043, the fusion processing unit 1040 outputs the final recognition result.

Figure 18:
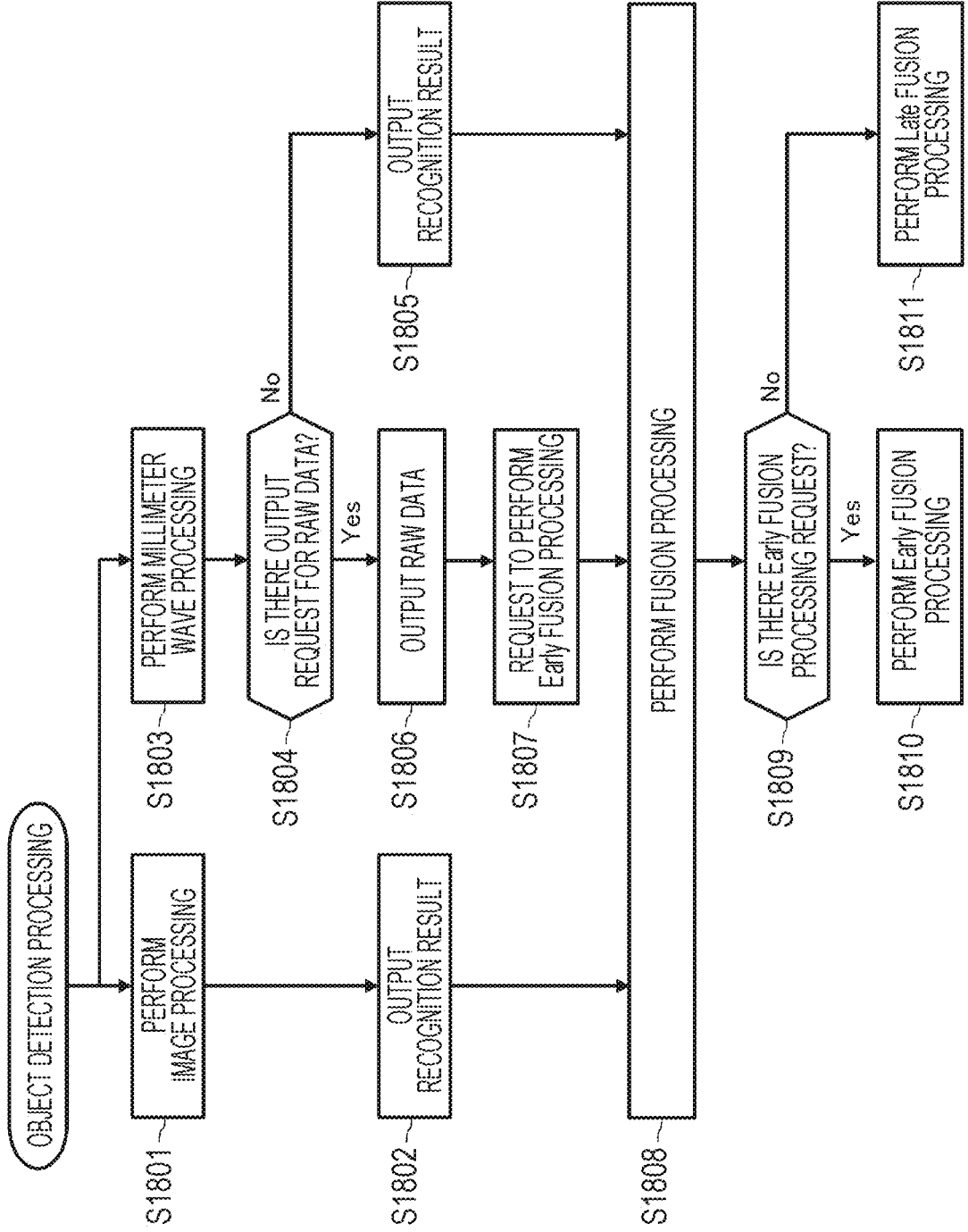
FIG. 18 is a flowchart showing a processing procedure for performing target recognition in the information processing device 1000 shown in FIG. 17.

FIG. 18 shows a processing procedure for performing target recognition in the information processing device 1000 shown in FIG. 17 in a flowchart form. However, here, for the sake of simplicity of description, the processing procedure is limited to a case where the information processing device 1000 performs fusion processing of two sensors, the camera 1070 and the millimeter wave radar 1080.

When object detection processing is started, the camera recognition processing unit 1010 performs image processing on the RAW data (captured image) of the camera 1070 (step S1801) and outputs the recognition result by the recognizer 1013 (step S1802).

Furthermore, the radar recognition processing unit 1020 performs signal processing on the RAW data of the millimeter wave radar 1080 (step S1803). Then, the radar recognition processing unit 1020 checks whether or not the output request for the RAW data has been received (step S1804).

The determination processing unit 1701 in the fusion processing unit 1042 compares the recognition results of the recognizer 1013 of the camera recognition processing unit 1010 and the recognizer 1023 of the radar recognition processing unit 1020 to determine whether or not the RAW data of the millimeter wave radar 1080 is necessary. In a case where the RAW data is necessary, the determination processing unit 1701 requests the radar recognition processing unit 1020 to output the RAW data of the millimeter wave radar 1080 (as described above). Specifically, under the situation corresponding to pattern 2 in FIG. 13, the determination processing unit 1701 determines that the RAW data of the millimeter wave radar 1080 is necessary.

Here, when the output request for the RAW data has not been received (No in step S1804), the radar recognition processing unit 1020 outputs the recognition result by the recognizer 1023 (step S1805). Furthermore, on receipt of the output request for the RAW data (Yes in step S1804), the radar recognition processing unit 1020 outputs the RAW data of the millimeter wave radar 1080 (step S1806), and requests the subsequent-stage fusion processing unit 1040 to perform early fusion processing or hybrid fusion processing using the RAW data of the millimeter wave radar 1080 (step S1807).

Then, the fusion processing unit 1040 performs fusion processing on the processing details of the camera recognition processing unit 1010 and the radar recognition processing unit 1020 (step S1808). When the request for early fusion processing or hybrid fusion processing has been received (Yes in step S1809), the fusion processing unit 1040 performs early fusion processing by the early fusion processing unit 1041 or hybrid fusion processing by the hybrid fusion processing unit 1043 (step S1810). On the other hand, when the request for early fusion processing or hybrid fusion processing has not been received (No in step S1809), the fusion processing unit 1040 performs late fusion processing by the late fusion processing unit 1041 (step S1811).

Figure 19:
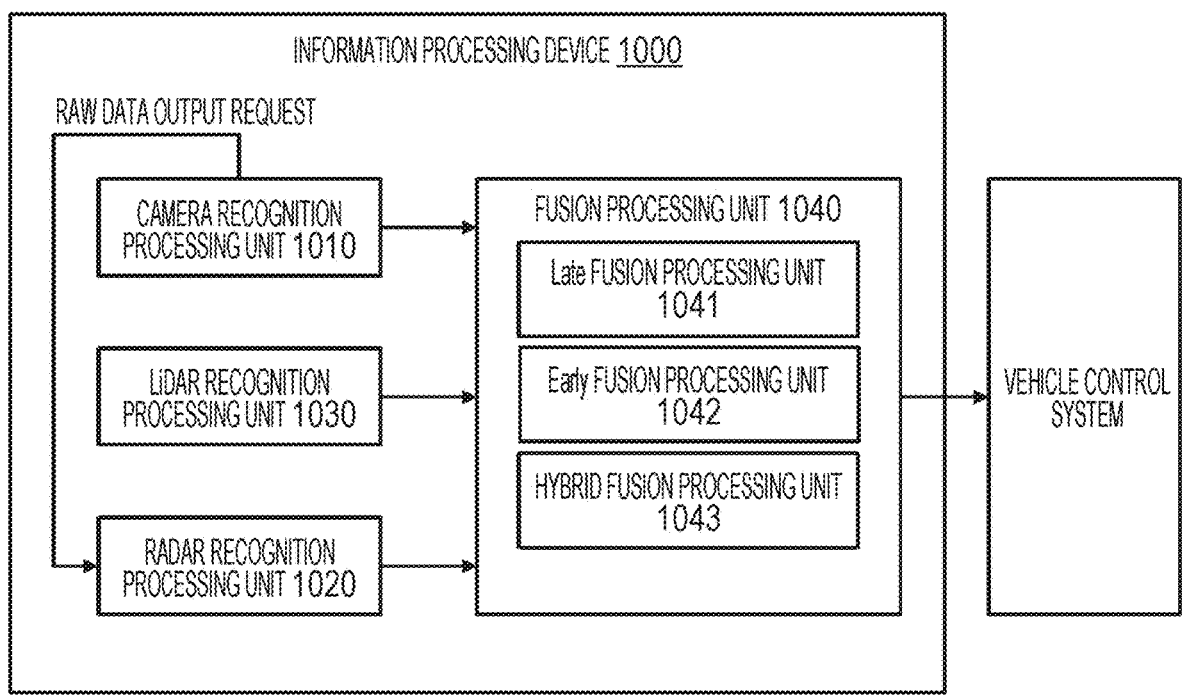
FIG. 19 is a diagram showing another configuration example of the information processing device 1000 configured to perform early fusion processing adaptively.

FIG. 19 schematically shows another configuration example of the information processing device 1000 configured to perform early fusion processing adaptively. However, in FIG. 19, the same functional module as shown in FIG. 1 is denoted with the same reference number.

When the recognizer 1013 cannot recognize the target, or in a case where the recognition rate of the target is not sufficient, the camera recognition processing unit 1010 determines that the RAW data of the millimeter wave radar 1080 is necessary, and requests the radar recognition processing unit 1020 to output the RAW data of the millimeter wave radar 1080. In response to the request from the camera recognition processing unit 1010, the radar recognition processing unit 1020 outputs the RAW data of the millimeter wave radar 1080. Then, the early fusion processing unit 1042 uses the RAW data to perform early fusion processing, or the hybrid fusion processing unit 1043 uses the RAW data to perform hybrid fusion processing. Then, in addition to the recognition result by the late fusion processing unit 1041, with reference to the recognition result by the early fusion processing unit 1042 or the hybrid fusion processing unit 1043, the fusion processing unit 1040 outputs the final recognition result.

Figure 20:
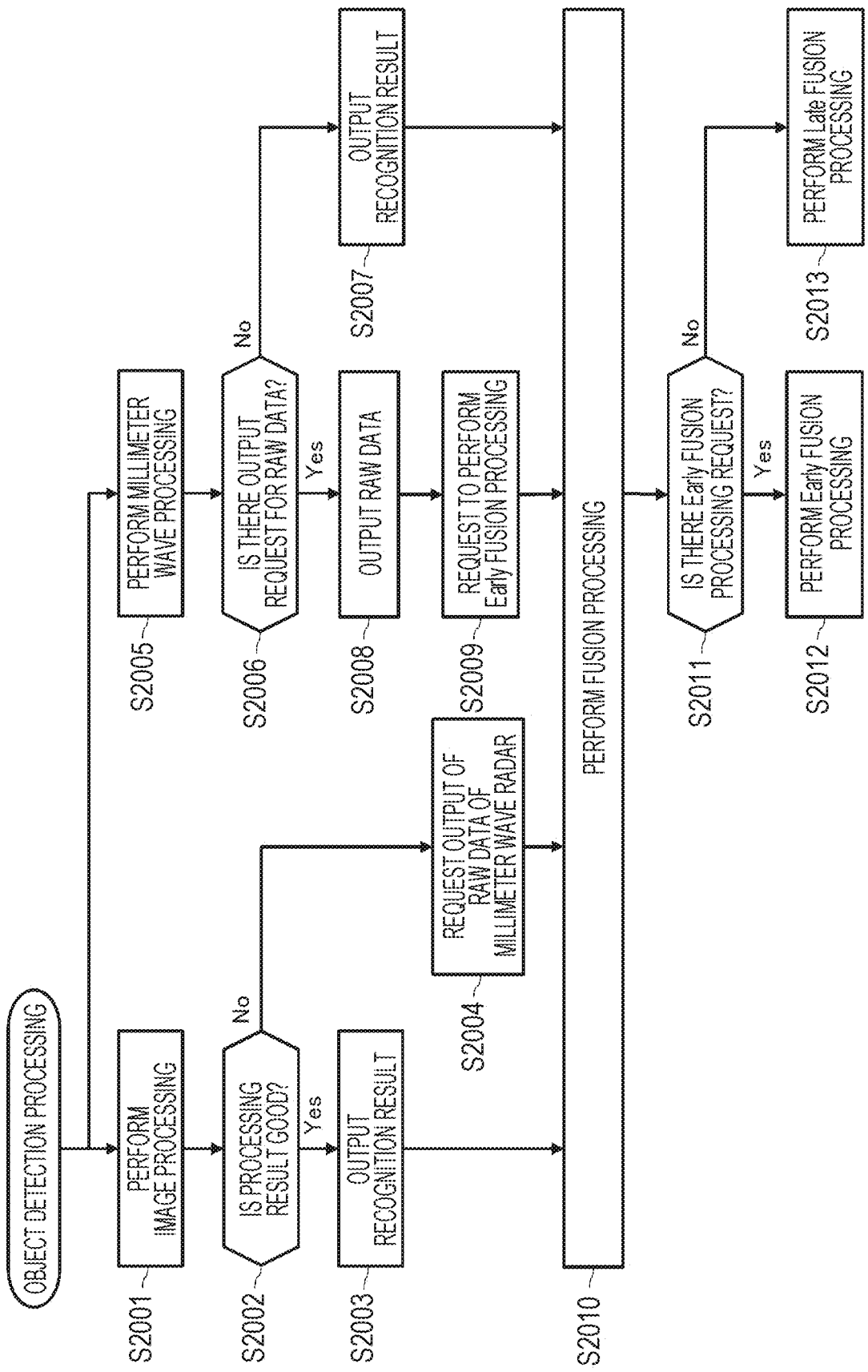
FIG. 20 is a flowchart showing the processing procedure for performing the target recognition in the information processing device 1000 shown in FIG. 19.

FIG. 20 shows a processing procedure for performing target recognition in the information processing device 1000 shown in FIG. 19 in a flowchart form. However, here, for the sake of simplicity of description, the processing procedure is limited to a case where the information processing device 1000 performs fusion processing of two sensors, the camera 1070 and the millimeter wave radar 1080.

When object detection processing is started, the camera recognition processing unit 1010 performs image processing on the RAW data (captured image) of the camera 1070 (step S2001). Then, the camera recognition processing unit 1010 checks whether or not the image processing result is good (step S2002).

Here, when the image processing result is good (Yes in step S2002), the camera recognition processing unit 1010 outputs the recognition result by the recognizer 1013 (step S2003). Furthermore, when the image processing result is not good (No in step S2002), the camera recognition processing unit 1010 requests the radar recognition processing unit 1020 to output the RAW data of the millimeter wave radar 1080 (step S2004). Specifically, the image processing result is not good under the situation corresponding to pattern 4 in FIG. 13.

Furthermore, the radar recognition processing unit 1020 performs signal processing on the RAW data of the millimeter wave radar 1080 (step S2005). Then, the radar recognition processing unit 1020 checks whether or not the output request for the RAW data has been received (step S2006).

Here, when the output request for the RAW data has not been received (No in step S2006), the radar recognition processing unit 1020 outputs the recognition result by the recognizer 1023 (step S2007). Furthermore, on receipt of the output request for the RAW data (Yes in step S2006), the radar recognition processing unit 1020 outputs the RAW data of the millimeter wave radar 1080 (step S2008), and requests the subsequent-stage fusion processing unit 1040 to perform early fusion processing or hybrid fusion processing on the RAW data of the millimeter wave radar 1080 (step S2009).

Then, the fusion processing unit 1040 performs fusion processing on the processing details of the camera recognition processing unit 1010 and the radar recognition processing unit 1020 (step S3010). When the request for early fusion processing or hybrid fusion processing has been received (Yes in step S3011), the fusion processing unit 1040 performs early fusion processing by the early fusion processing unit 1041 or hybrid fusion processing by the hybrid fusion processing unit 1043 (step S3012). On the other hand, when the request for early fusion processing or hybrid fusion processing has not been received (No in step S3011), the fusion processing unit 1040 performs late fusion processing by the late fusion processing unit 1041 (step S3013).

INDUSTRIAL APPLICABILITY

The technology disclosed in the present specification has been described in detail above with reference to the specific embodiment. However, it is obvious that those skilled in the art can modify or substitute the embodiment without departing from the spirit of the technology disclosed in the present specification The present specification has mainly described the embodiment regarding fusion of vehicle-mounted sensors, but the scope of application of the technology disclosed in the present specification is not limited to vehicles. The technology disclosed in the present specification can be similarly applied to various types of mobile devices, for example, unmanned aerial vehicles such as drones, robots that autonomously move in a predetermined work space (home, office, factory, and the like), ships, aircrafts, and the like. Of course, the technology disclosed in the present specification can also be similarly applied to information terminals installed in mobile devices and various non-mobile devices.

In short, the technology disclosed in the present specification has been described in the form of illustration, and details of description of the present specification should not be interpreted in a limited manner. To determine the spirit of the technology disclosed in the present specification, the claims should be considered.

Note that the technology disclosed in the present specification can also have the following configurations.

(1) An information processing device including:
  a recognition unit configured to perform recognition processing on an object on the basis of a detection signal of a sensor; and
  a processing unit configured to perform fusion processing on first data before the recognition by the recognition unit and another data. This information processing device has the effect of being able to recognize more objects by using the first data including information before omission at a determination threshold by the recognition unit for fusion processing.

(2) The information processing device according to (1) described above, in which
  the sensor includes a millimeter wave radar. This information processing device has the effect of being able to recognize more objects by performing fusion processing on a recognition result having a high likelihood but a small information amount after being recognized by a recognizer for the millimeter wave radar, with abundant RAW data before omission at the determination threshold by the recognizer.

(3) The information processing device according to (2) described above, in which before the recognition, the recognition unit performs processing of each of distance detection, speed detection, angle detection of the object, and tracking of the object on the basis of the detection signal of the sensor, and the first data includes at least one of the detection signal, a distance detection result of the object, a speed detection result, an angle detection result, or a tracking result of the object. This information processing device has the effect of being able to recognize more objects by performing fusion processing on RAW data of the millimeter wave radar and information obtained in each stage of signal processing of the RAW data such as a distance, speed, angle, and tracking result of the object, and a recognition result of the recognizer.

(4) The information processing device according to any one of (1) to (3) described above, further including a second recognition unit configured to perform recognition processing on the object on the basis of a detection signal of a second sensor, in which the processing unit performs at least one fusion processing of fusion processing on third data before the recognition by the second recognition unit and the first data, fusion processing on fourth data after the recognition by the second recognition unit and the first data, fusion processing on the first data and second data after the recognition by the recognition unit, or fusion processing on the fourth data and the second data. This information processing device has the effect of being able to recognize more objects by performing fusion processing on data before recognition by the recognizers of the first sensor and the second sensor, and fusion processing on data after recognition by the recognizers of the first sensor and the second sensor.

(5) The information processing device according to (4) described above, in which the second sensor includes at least one of a camera or a LiDAR. This information processing device has the effect of being able to recognize more objects by performing fusion processing on the recognition results of the millimeter wave radar and the camera or the LiDAR, and performing fusion processing on the RAW data of the millimeter wave radar and the camera or the LiDAR.

(6) The information processing device according to (4) or (5) described above, in which the processing unit determines a method of using the first data in the fusion processing on the basis of a recognition result of the recognition unit and a recognition result of the second recognition unit. This information processing device has the effect of being able to recognize more objects by using the first data adaptively for fusion processing on the basis of the recognition result of the recognition unit and the recognition result of the second recognition unit.

(7) The information processing device according to (6) described above, in which in a case where likelihood of the recognition by the second recognition unit is high but likelihood of the recognition by the recognition unit is low, the processing unit uses the first data in the fusion processing. This information processing device has the effect of being able to recognize more objects while avoiding unnecessary fusion processing by using the first data adaptively in the fusion processing.

(8) The information processing device according to any one of (4) to (7) described above, in which the processing unit determines a method of using the first data in the fusion processing on the basis of a recognition result by the second recognition unit. This information processing device has the effect of being able to recognize more objects while avoiding unnecessary fusion processing by using the first data adaptively in the fusion processing.

(9) The information processing device according to (8) described above, in which the processing unit uses the first data in the fusion processing in a case where likelihood of the recognition by the second recognition unit is low. This information processing device has the effect of being able to recognize more objects while avoiding unnecessary fusion processing by using the first data adaptively in the fusion processing.

(10) An information processing method including:

a recognition step of performing recognition processing on an object on the basis of a detection signal of a sensor; and a processing step of performing fusion processing on first data before the recognition in the recognition step and another data. This information processing method has the effect of being able to recognize more objects by performing fusion processing on second data after recognition in the recognition step and the first data including information before omission at a determination threshold in the recognition step.

(11) The information processing method according to (10) described above, in which the processing step includes performing at least one fusion processing of fusion processing on third data before the recognition by the second recognition unit and the first data, fusion processing on fourth data after the recognition by the second recognition unit and the first data, fusion processing on the first data and second data after the recognition by the recognition unit, or fusion processing on the fourth data and the second data.

(12) A computer program described in a computer-readable format for causing a computer to function as:

a recognition unit configured to perform recognition processing on an object on the basis of a detection signal of a sensor; and a processing unit configured to perform fusion processing on first data before the recognition by the recognition unit and another data.

(13) The computer program according to (12) described above, in which the processing unit performs at least one fusion processing of fusion processing on third data before the recognition by the second recognition unit and the first data, fusion processing on fourth data after the recognition by the second recognition unit and the first data, fusion processing on the first data and second data after the recognition by the recognition unit, or fusion processing on the fourth data and the second data.

(14) A mobile device including:

a moving means;

a sensor;

a recognition unit configured to perform recognition processing on an object on the basis of a detection signal of the sensor;
a processing unit configured to perform fusion processing on first data before the recognition by the recognition unit and another data; and
a control unit configured to control the moving means on the basis of a processing result of the processing unit. This mobile device has the effect of being able to recognize more objects and to complete the moving means so as to avoid collision with the object by performing fusion processing on second data after recognition by the recognition unit and the first data including information before omission at a determination threshold by the recognition unit.

(15) The mobile device according to (14) described above, in which
the processing unit performs at least one fusion processing of fusion processing on third data before the recognition by the second recognition unit and the first data, fusion processing on fourth data after the recognition by the second recognition unit and the first data, fusion processing on the first data and second data after the recognition by the recognition unit, or fusion processing on the fourth data and the second data.

REFERENCE SIGNS LIST

100 Vehicle control system
101 Input unit
102 Data acquisition unit
103 Communication unit
104 Inside-vehicle device
105 Output control unit
106 Output unit
107 Drive-affiliated control unit
108 Drive-affiliated system
109 Body-affiliated control unit
110 Body-affiliated system
111 Storage unit
112 Automated driving control unit
121 Communication network
131 Detection unit
132 Self-position estimation unit
133 Situation analysis unit
134 Planning unit
135 Operation control unit
141 Outside-vehicle information detection unit
142 Inside-vehicle information detection unit
143 Vehicle state detection unit
151 Map analysis unit
152 Traffic rule recognition unit
153 Situation recognition unit
154 Situation prediction unit
161 Route planning unit
162 Behavior planning unit
163 Operation planning unit
171 Emergency avoidance unit
172 Acceleration-deceleration control unit
173 Direction control unit
1000 Information processing device
1010 Camera recognition processing unit
1011 RAW data processing unit
1012 Signal processing unit
1013 Recognizer
1020 Radar recognition processing unit
1021 RAW data processing unit
1022 Signal processing unit
1023 Recognizer
1030 LiDAR recognition processing unit
1031 RAW data processing unit
1032 Signal processing unit
1033 Recognizer
1040 Fusion processing unit
1041 Late fusion processing unit
1042 Early fusion processing unit
1043 Hybrid fusion processing unit
1050 ECT
1060 Actuator (ACT)
1070 Camera
1080 Millimeter wave radar
1090 LiDAR
601 Distance detection unit
602 Speed detection unit
603 Angle detection unit
604 Tracking unit
605 MISC processing unit

The invention claimed is:

1. An information processing device comprising:
a first recognition unit configured to perform a first recognition processing on an object based on a detection signal of a first sensor, the first recognition processing resulting in a first recognition result; and
a processing unit configured to:
assess a quality of the first recognition result; and
based on the quality of the first recognition result, perform early fusion processing on first raw data from the first sensor and second raw data from a second sensor.

2. The information processing device according to claim 1, wherein the first sensor includes a millimeter wave radar.

3. The information processing device according to claim 2, wherein
before the first recognition result is generated, the first recognition unit is configured to perform processing of each of distance detection, speed detection, angle detection of the object, and tracking of the object based on the detection signal of the first sensor, and
the first raw data includes at least one of the detection signal of the first sensor, a distance detection result of the object, a speed detection result, an angle detection result, or a tracking result of the object.

4. The information processing device according to claim 1, further comprising a second recognition unit configured to perform a second recognition processing on the object based on a detection signal of the second sensor, the second recognition processing of the second recognition unit resulting in a second recognition result,
wherein the processing unit is configured to perform hybrid fusion processing of the second recognition result with the first raw data and/or the second raw data.

5. The information processing device according to claim 4, wherein the second sensor includes at least one of a camera or a LiDAR.

6. The information processing device according to claim 4, wherein
the processing unit is further configured to determine a method of using the first raw data in the hybrid fusion processing based on at least one of the first recognition result of the first recognition unit and the second recognition result of the second recognition unit.

7. The information processing device according to claim 6, wherein in a case where likelihood of the second recognition result by the second recognition unit is above a threshold but likelihood of the first recognition result by the first recognition unit is below a threshold, the processing unit is configured to use the first raw data in the hybrid fusion processing.

8. The information processing device according to claim 4, wherein
the processing unit is further configured to determine a method of using the first raw data in the hybrid fusion processing based on the second recognition result by the second recognition unit.

9. The information processing device according to claim 8, wherein the processing unit is configured to use the first raw data in the hybrid fusion processing in a case where likelihood of the second recognition result by the second recognition unit is below a threshold.

10. An information processing method comprising:
a first recognition step of performing a first recognition processing on an object based on a detection signal of a first sensor, the first recognition processing resulting in a first recognition result; and
a processing step of:
assessing a quality of the first recognition result and based on the quality of the first recognition result, performing early fusion processing on first raw data from the first sensor and second raw data from a second sensor.

11. The information processing method according to claim 10, further comprises a second recognition step of performing a second recognition processing on the object based on a detection signal of the second sensor, the second recognition processing resulting in a second recognition result,
wherein the processing step includes performing hybrid fusion processing of the second recognition result with the first raw data and/or the second raw data.

12. A storage device storing a computer program for causing a computer to function as:
a first recognition unit configured to perform a first recognition processing on an object based on a detection signal of a first sensor, the first recognition processing resulting in a first recognition result; and
a processing unit configured to:
assess a quality of the first recognition result, and based on the quality of the first recognition result, perform early fusion processing on first raw data from the first sensor and second raw data from a second sensor.

13. The computer program according to claim 12, further comprising a second recognition unit configured to perform a second recognition processing on the object based on a detection signal of the second sensor, the second recognition processing of the second recognition unit resulting in a second recognition result,
wherein the processing unit is configured to perform hybrid fusion processing of the second recognition result with the first raw data and/or the second raw data.

14. The information processing device according to claim 4, wherein the processing unit is further configured to perform late fusion processing of the second recognition result with the first recognition result.

15. An information processing device comprising:
a first sensor processing unit configured to receive first raw data from a first sensor;
a second sensor processing unit configured to receive second raw data from a second sensor;
a first recognition unit configured to perform first recognition processing on the first raw data and to generate a first recognition result;
a second recognition unit configured to perform second recognition processing on the second raw data and to generate a second recognition result;
an early fusion processor configured to perform fusion processing using the first raw data and second raw data and to generate an early fusion output;
a late fusion processor configured to perform fusion processing on the first recognition result and the second recognition result and to generate a late fusion output; and
a processor configured to process the early fusion output and the late fusion output to generate a combined recognition result.

16. The information processing device of claim 15, wherein the early fusion processor and late fusion processor are a same processor.

17. The information processing device according to claim 15, further comprises a hybrid fusion processor configured to perform fusion processing using one of either the first raw data and the second recognition result or the first recognition result and the second raw data and to generate a hybrid fusion output,
wherein the processor is further configured to process the hybrid fusion output with at least one of the early fusion output and the late fusion output to generate a combined recognition result.

18. The information processing device according to claim 15, wherein
the first sensor includes a millimeter wave radar,
before the first recognition result is generated, the first recognition unit is configured to perform processing of each of distance detection, speed detection, and angle detection of an object, and tracking of the object based on a detection signal of the first sensor, and
the first raw data includes at least one of the detection signal of the first sensor, a distance detection result of the object, a speed detection result, an angle detection result, or a tracking result of the object.

19. An information processing method comprising:
a receiving step of receiving first raw data from a first sensor and second raw data from a second sensor;
a first recognition step of performing first recognition processing on the first raw data and to generate a first recognition result;
a second recognition step of performing second recognition unit configured to perform second recognition processing on the second raw data and to generate a second recognition result; and
a processing step of:
early fusion processing using the first raw data and second raw data to generate an early fusion output,
late fusion processing on the first recognition result and the second recognition result to generate a late fusion output, and
processing the early fusion output and the late fusion output to generate a combined recognition result.

20. The information processing method according to claim 19, wherein a processing step further comprises:
hybrid fusion processing using one of either the first raw data and the second recognition result or the first recognition result and the second raw data to generate a hybrid fusion output and processing the hybrid fusion output with at least one of the early fusion output and the late fusion output to generate a combined recognition result.

\* \* \* \* \*